FIG_1

Jan. 2, 1951 P. C. WILBUR 2,536,115
METHOD OF AND APPARATUS FOR HEAT-TREATING
EVAPORATED MILK
Filed Sept. 4, 1945 8 Sheets-Sheet 4
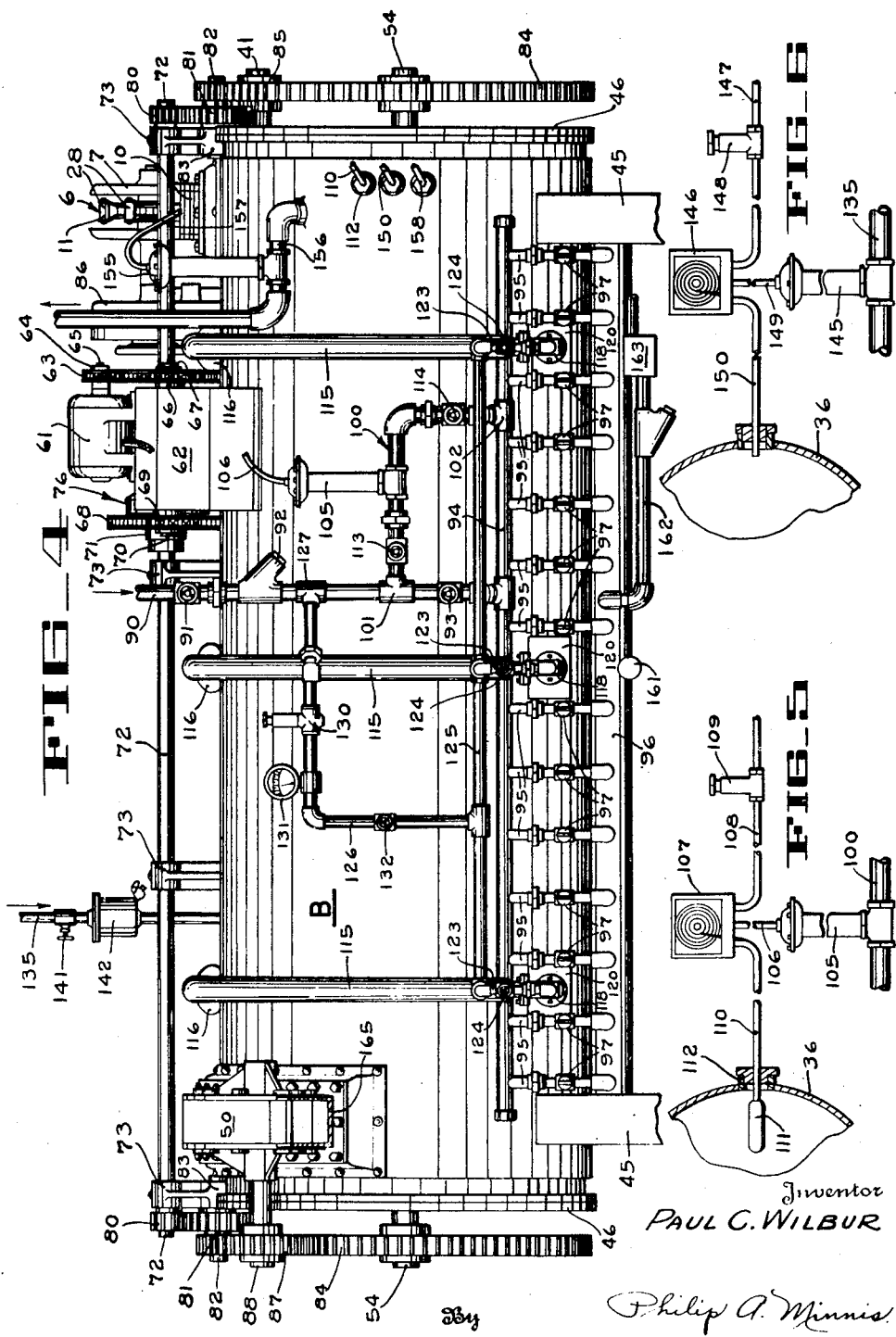
Inventor
PAUL C. WILBUR
By Philip A. Minnis
Attorney

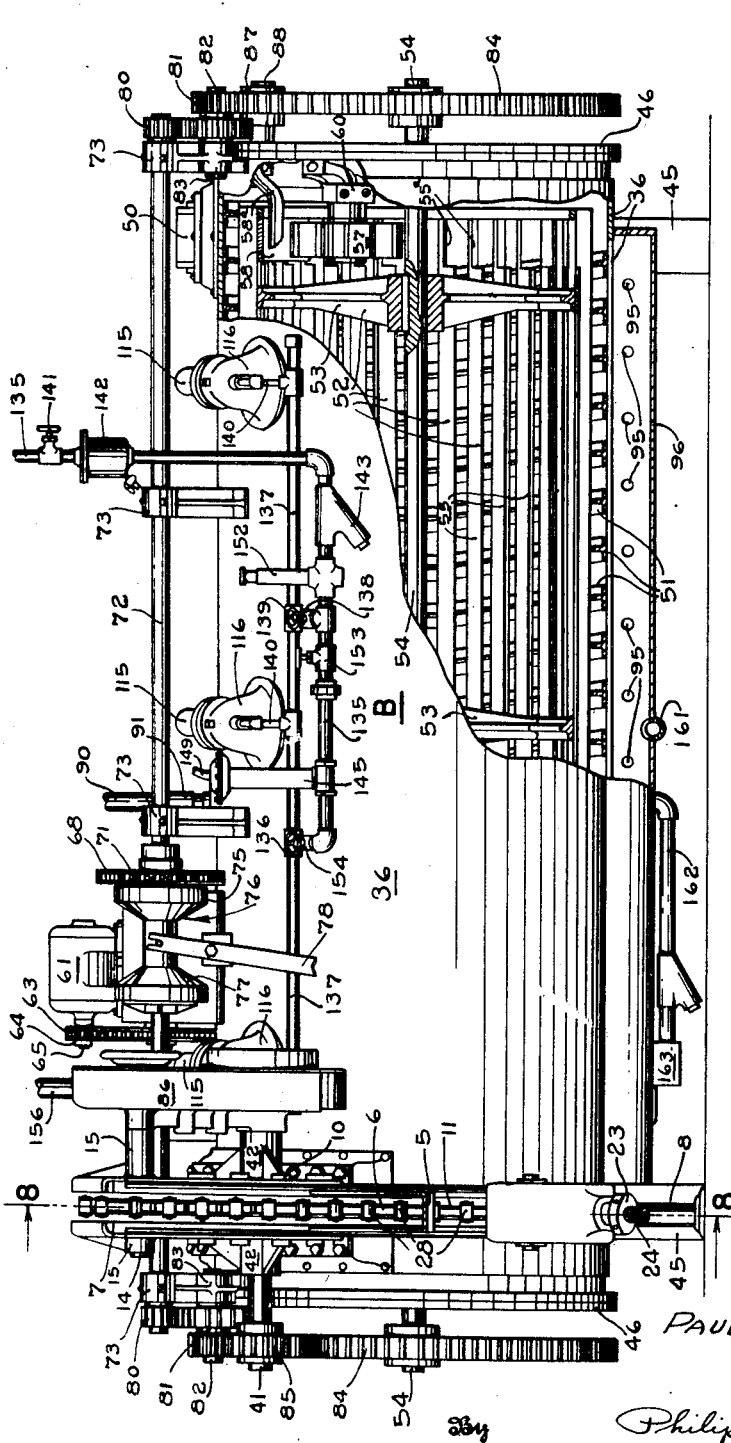

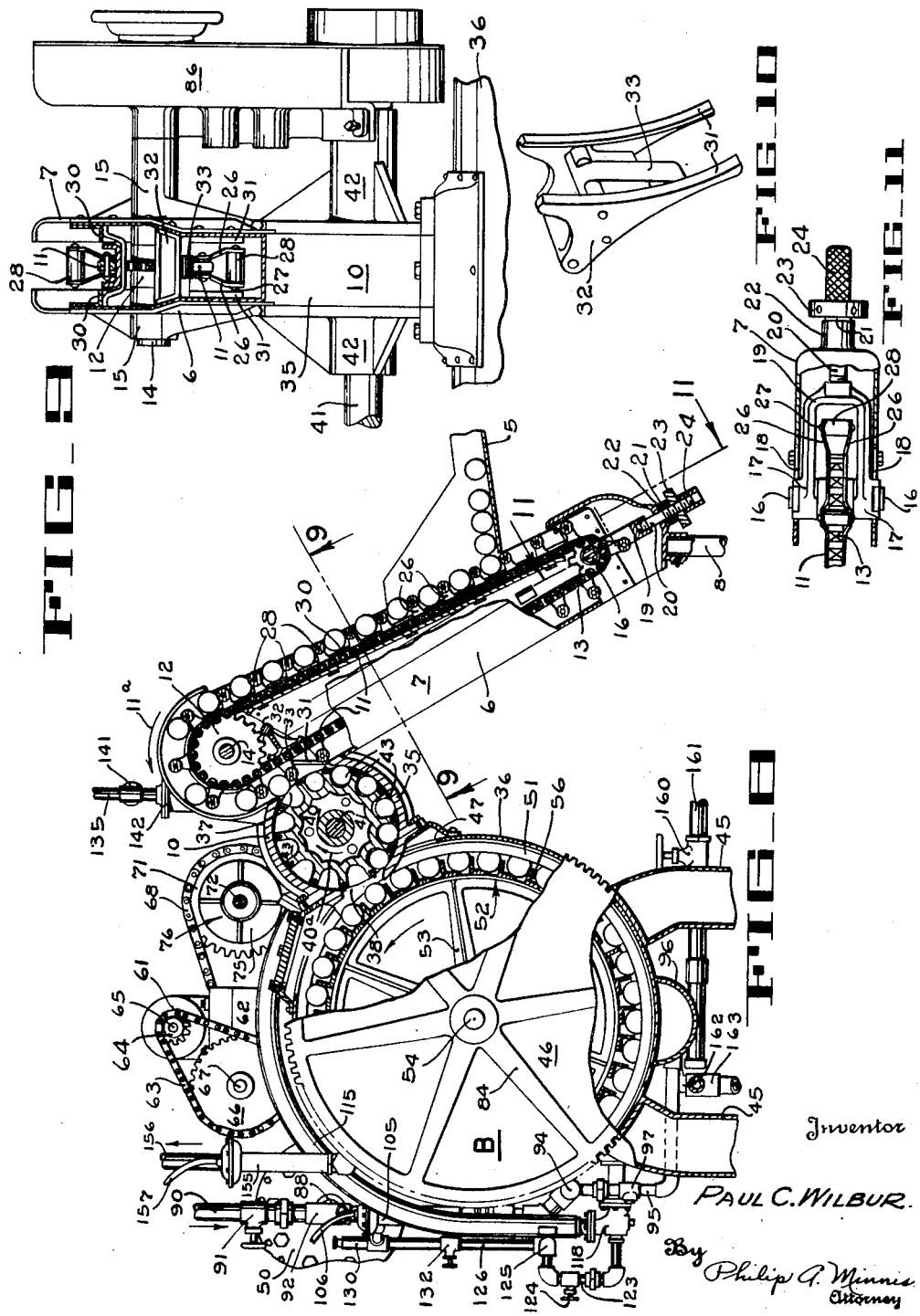

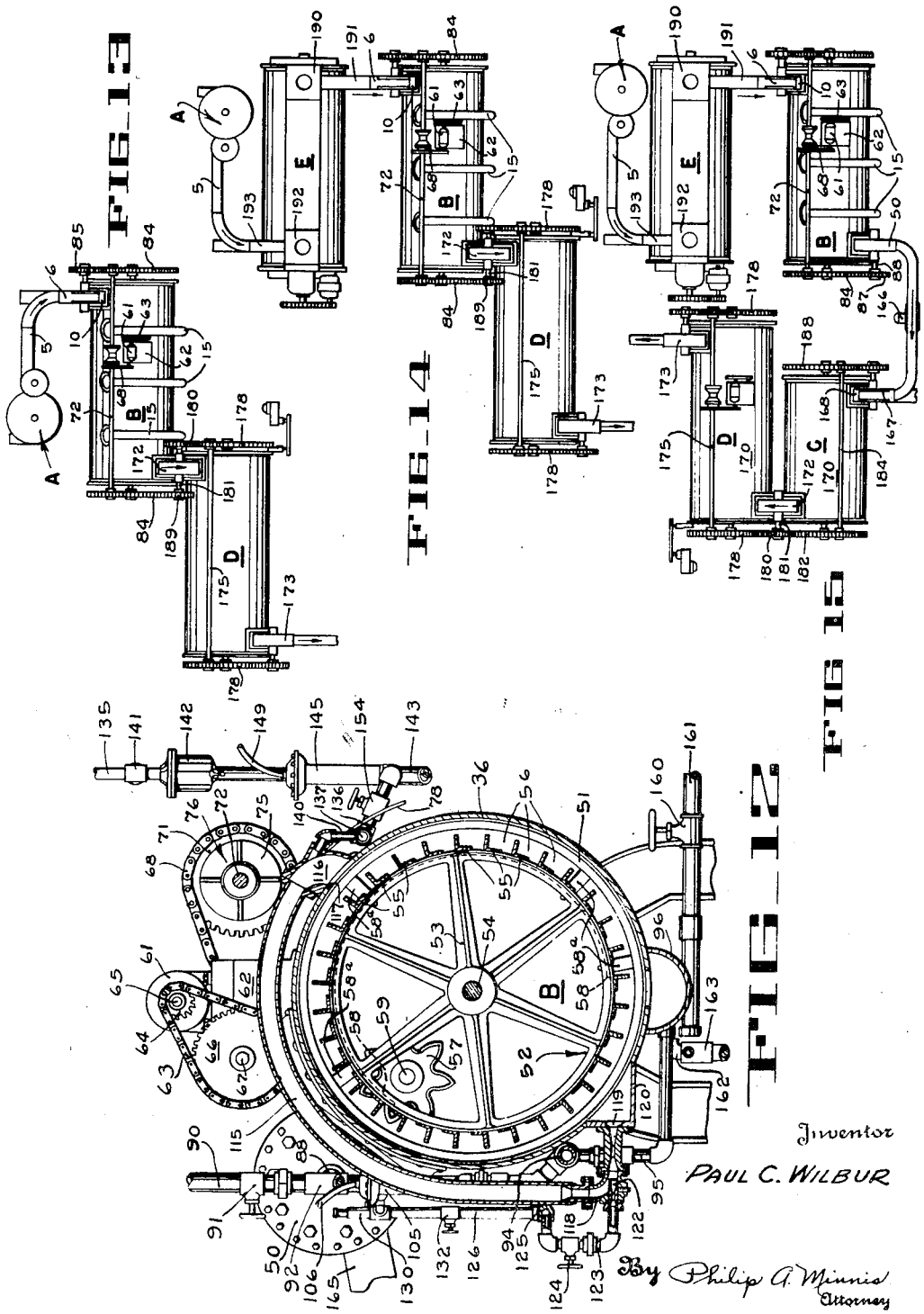

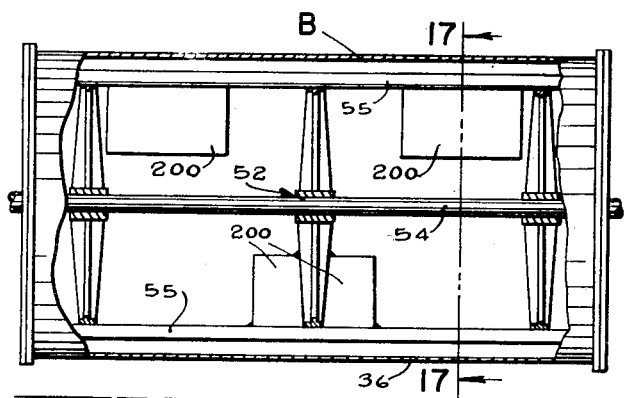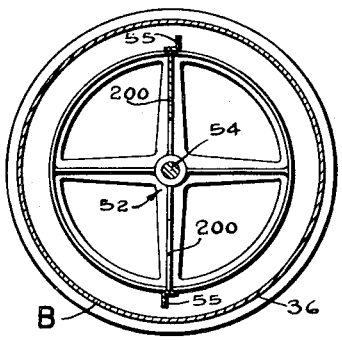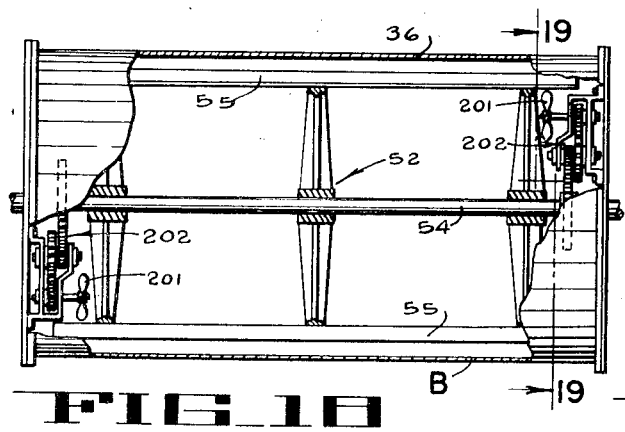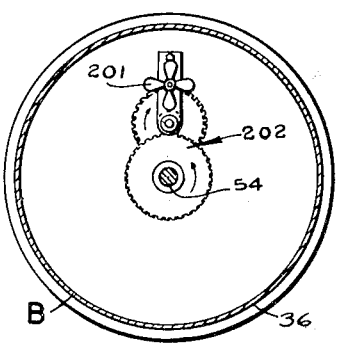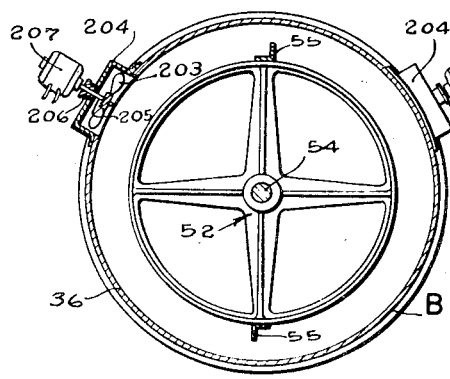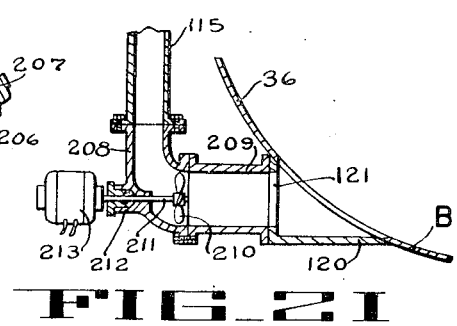

Patented Jan. 2, 1951

2,536,115

UNITED STATES PATENT OFFICE 2,536,115

METHOD OF AND APPARATUS FOR HEAT-TREATING EVAPORATED MILK

Paul C. Wilbur, San Jose, Calif., assignor to Food Machinery and Chemical Corporation, a corporation of Delaware Application September 4, 1945, Serial No. 614,234

42 Claims. (Cl. 99—214)

The present invention relates to the canning art, and is concerned with an improved method of heat treating evaporated milk in hermetically sealed metallic containers (herein referred to as "cans") for purposes of preservation. The invention is also concerned with the provision of a new and improved apparatus which may be used in practicing such method.

In the processing of evaporated milk it is highly desirable to minimize the heat treatment as much as possible, since the application of heat adversely affects the color and flavor of the milk and consequently, the more severe the heat treatment, the more the natural color and flavor of the milk is altered.

In the present commercial practice of heat treating non-acid food products the hermetically sealed cans, into which the food products have been filled, either with or without previous heating thereof but while at a relatively low temperature, are practically always subjected to a temperature of well above 212° F. to sterilize the contents thereof. The desired heat treatment for sterilization of the products is obtained by subjecting the containers to a heating medium consisting either of an atmosphere of saturated steam or water, or both, maintained at the desired temperature and pressure. The higher the temperature used for sterilization of a given product and can size, the shorter is the time necessary for sterilization thereof. This is because of the well known fact that the thermal death time of spoilage organisms decreases with increasing temperature.

In commercial practice it is usually preferred to use the highest sterilization temperature which experience has shown will not cause deterioration of the product within the time necessary for sterilization thereof. With most products, short time sterilization treatment in the temperature range of 250° F. to 260° F. results in better quality than longer time sterilization treatment in the temperature range of 240° F. to 250° F.

In the art of canning evaporated milk, it has been found, however, that the complex composition of the product makes it impossible to employ sterilization procedures ordinarily used on other products without serious difficulties. If a can of evaporated milk having the usual filling temperature of approximately 50° F. is introduced suddenly into a heating medium of saturated steam or water having a practical sterilization temperature, deposits of milk solids will form on the inside surface of the can which are known to the trade as "burn-on." Such deposits or "burn-on," even when present in very minute quantities as an extremely fine film, are regarded as seriously objectionable by the trade which desires a bright, uncoated can interior.

Therefore, in order to accomplish the desired sterilization and at the same time avoid the objectionable "burn-on," it has been necessary heretofore to subject the cans of evaporated milk to a preliminary heat treatment of gradually increasing intensity beginning with a relatively low temperature so that the temperature differential between the milk and the heating medium is at no time sufficient to cause "burn-on."

The treatment of the milk in the manner above stated is generally carried out in commercial practice as a continuous process as follows: The evaporated milk is filled into the cans at a temperature of approximately 50° F. to prevent foaming of the milk, and the cans are then closed and passed in a continuous procession through a heating chamber, known as a preheater, in which hot water is employed as the heating medium. This preheater is so constructed as to provide a series of heating zones in which the water is maintained at successively increased temperatures ranging from about 90° F. to 120° F. in the zone at the inlet end of the preheater to about 212° F. in the final zone. Thus as the cans pass through the preheater the temperature of the milk is gradually raised from its filling temperature to about 212° F. This customarily requires about 15 to 18 minutes and it is ordinarily desirable and general practice to hold the milk at the latter temperature for about five minutes before it is discharged from the preheater, the length of the final temperature zone of the preheater being such as to provide for this holding period. Thus, the entire preheating step requires a total of about 20 to 23 minutes.

After the cans have been passed through the preheater as above described, they are then introduced into and passed through a steam chamber, known as the sterilizer, wherein a saturated steam atmosphere or a heating medium of water, or both, of a constant temperature of about 240° F. to 245° F., and corresponding pressure, is maintained. As the cans pass through the sterilizer, the milk temperature is rapidly raised from about 212° F. to about 240° F. to 245° F. and maintained at that temperature for a sufficient length of time to effect the necessary sterilization, whereupon the cans are discharged from the sterilizer into a pressure cooler in which they are cooled down to, or fairly close to, room temperature. The time required for the heat treatment in commercial types of continuous sterilizers, such as are commonly employed at the present time, is about 10 to 15 minutes depending upon the particular sterilization temperature used within the limits stated above.

It is well known that evaporated milks vary greatly in character depending upon the locality, the time of year, the breed of cattle, the type of feed of the dairy herd, and a variety of other factors. Some milks are much more sensitive to temperature and will "burn-on" more readily than others so that in spite of the precautions taken, "burn-on" sometimes occurs even in the conventional procedure hereinabove described, usually at the point of introduction of the cans into the sterilizer, due to the temperature differential between the preheated milk and the temperature of the steam or water in the sterilizer. I have found that this is invariably the case with American Standard evaporated milk if such temperature differential exceeds about 35.6° F. American Standard evaporated milk is the common evaporated milk of commerce in the United States. It is required by law to contain not less than 18% non-fat solids and generally contains somewhere between 18% and 19%.

In following the prior conventional practice, it has also been found that relatively small departures from the accepted times and temperatures result in very pronounced effects on the milk, so that in spite of repeated attempts, it has heretofore been found impossible to reduce the time required for the heat treatment to any material extent, either by increasing the sterilization temperature, or by shortening or eliminating the preheating period, without causing or increasing "burn-on." The elimination of the preheating period has been impossible heretofore for the reason that no evaporated milk is sufficiently stable so that it can be subjected, while at the customary filling temperature, to a saturated steam atmosphere or water having a temperature anywhere near the desired sterilization temperature without causing extremely heavy "burn-on."

To summarize the foregoing, it has heretofore been necessary to control the temperature in the heat treatment of evaporated milk within very close limits, and in such manner as to effect a very gradual preheating of the milk prior to the sterilizing treatment to prevent or minimize "burn-on" of the milk and thereby obtain a final product acceptable to the trade. Such procedure not only requires a comparatively long overall processing time which adversely affects the color and flavor of the milk, but also, as above pointed out, is not always fully effective in preventing "burn-on."

It is an object of the present invention to provide an improved method of heat treating evaporated milk in sealed cans whereby "burn-on" is eliminated; the time required for the heat treatment is shortened; and a product having improved color and flavor is produced.

Another object of the present invention is to provide a method of heat treating evaporated milk in sealed cans which makes it possible to employ higher temperatures and higher temperature differentials than have heretofore been found practical without causing "burn-on."

Another object of the invention is to provide a method of heat treating evaporated milk in sealed cans by which the preliminary treatment in graduated preheating zones such as heretofore required may either be shortened or eliminated altogether, according to preference.

It is also an object of my invention to provide an improved form of apparatus suitable for use in practicing my method referred to.

A further object is to provide a heat treating apparatus adapted to subject products in sealed containers to heat treatment in a heating medium comprising a mixture of air or certain other gases and steam under pressure, and in which provision is made for insuring uniformity of the mixture and preventing separation or stratification.

Another object is to provide an apparatus of the character just referred to in which the means for insuring uniformity of the mixture and preventing separation or stratification is adapted to function independently of the conveying mechanism by which the containers are conveyed through the apparatus.

Another object is to provide a heat treating apparatus adapted to subject products in sealed containers to heat treatment in a heating medium comprising a mixture of air or certain other gases and steam under pressure, and in which suitable controls are provided to enable the formation and maintenance of the desired proportions in such mixture.

Various additional objects and advantages of my invention will become more apparent from the following description, and from the accompanying drawings which are hereinafter more specifically identified and described.

I have discovered that by the use of a heating medium made up of a mixture of steam and noncondensable gas (i. e., a gas mixture of gases which will not condense on the relatively cold cans when the latter are introduced into the heating medium) it is possible to employ relatively high temperatures and temperature differentials in the heat treatment of evaporated milk as compared with prior conventional practice and thereby shorten the time required for the heat treatment while at the same time preventing "burn-on" of the milk.

Thus, I have found that although heavy "burn-on" invariably occurs when cans of evaporated milk are introduced into a bath of steam or water of 212° F., or higher, when the milk is at normal filling temperature (i. e. about 50° F.) or, in the case of American Standard evaporated milk, when the milk is at any temperature of about 35.6° F. or more below the temperature of such a bath, "burn-on" can be prevented at much greater temperature differentials by the selection of an appropriate mixture of steam and noncondensable gas.

From numerous heat treating tests conducted with a great variety of evaporated milks in steam-gas heating media I have found that the percentage of gas necessary to prevent "burn-on" of any particular milk is dependent upon the temperature differential between the temperature of the heating medium and the initial milk temperature, i. e., the temperature of the milk at the time it is introduced into the heating medium. I have further found that, since evaporated milks vary widely in character and, therefore, some milks react under heat treatment to different degrees than others, the precise amount of gas required in admixture with steam to prevent "burn-on" for any given temperature differential between the heating medium and the milk is also dependent upon the "burn-on" tendency and the non-fat solids content of the particular batch of milk undergoing treatment.

Consequently, the percentage of gas necessary in the steam-gas heating medium to prevent "burn-on" may be determined from the temperature differential between the temperature of the heating medium and the initial temperature of the milk at which it is subjected to the heating medium, and the "burn-on" tendency and non-fat solids content of the milk to be treated.

Any non-condensable gas or mixture of such gases may be used in admixture with steam to form the heating medium contemplated by my invention, but it is ordinarily desirable to select a gas of this character which is relatively inert and stable such as air, nitrogen, helium, carbon dioxide, flue gas, etc. By flue gas I have reference to the gaseous residue of combustion of carbonaceous fuel. For economic reasons I prefer to use air, and, therefore, in the following specific description of the present invention and the examples given therein reference is made to the employment of a steam-air heating medium, it being understood, however, that any other non-condensable gas, or any mixture of such gases, may be substituted for air if desired.

It may also be pointed out here that it is not essential to the process of my invention that the cans of milk be at the customary filling temperature at the time they are introduced into the steam-air heating medium. On the contrary, any filling temperature may be used, and the milk may be preheated, if desired, either before or after filling.

The method and apparatus of my invention and certain illustrative modes in which they may be used. will best be understood from the following detailed explanation and description taken in connection with the accompanying drawings in which:

Fig. 1 is a chart showing the relation of the temperature differential in degrees Fahrenheit between the temperature of the heating medium in the retort, such as the pressure heater hereinafter more specifically described. (designated RT) and the initial temperature of the milk at the time it is introduced into the heating medium (designated IT) with respect to the percentage of air in the air-steam heating medium necessary to prevent "burn-on" of evaporated milks having a non-fat solids content of 18.55%.

Fig. 4 is a side elevation of one side of the pressure heater only as viewed from the left of Fig. 3.

Figs. 5 and 6 are diagrams showing the arrangement of the temperature and pressure control mechanisms associated with the pressure heater.

Fig. 7 is a side elevation, partially in section, of the pressure heater as viewed from the right of Fig. 3.

Fig. 8 is a transverse vertical section through the pressure heater taken along the line 8—8 of Fig. 2, certain parts being shown in elevation.

Fig. 9 is an enlarged transverse section through the feed elevator taken along the line 9—9 of Fig. 8.

Fig. 10 is an enlarged perspective view of the can stripper forming a part of the feed elevator.

Fig. 11 is a fragmentary view of the lower portion of the feed elevator as viewed along the line 11—11 of Fig. 8.

Fig. 12 is a vertical transverse section through the pressure heater taken along the line 12—12 of Fig. 2.

Figs. 13 to 15 inclusive are diagrammatic illustrations of various modified arrangements of apparatus by which it is contemplated that the process of my invention may be carried out.

Fig. 16 is a diagrammatic longitudinal section through the pressure heater illustrating a modified form of agitating means for the heating medium.

Fig. 17 is a transverse section taken along the line 17—17 of Fig. 16.

Fig. 18 is a diagrammatic longitudinal section through the pressure heater illustrating another modified form of agitating means for the heating medium.

Fig. 19 is a transverse section taken along the line 19—19 of Fig. 18.

Fig. 20 is a diagrammatic vertical transverse section through the pressure heater illustrating a further modified form of agitating means for the heating medium.

Fig. 21 is a fragmentary sectional elevation of a modified form of apparatus for circulating the heating medium through the circulating conduits of the pressure heater.

Figure 1:
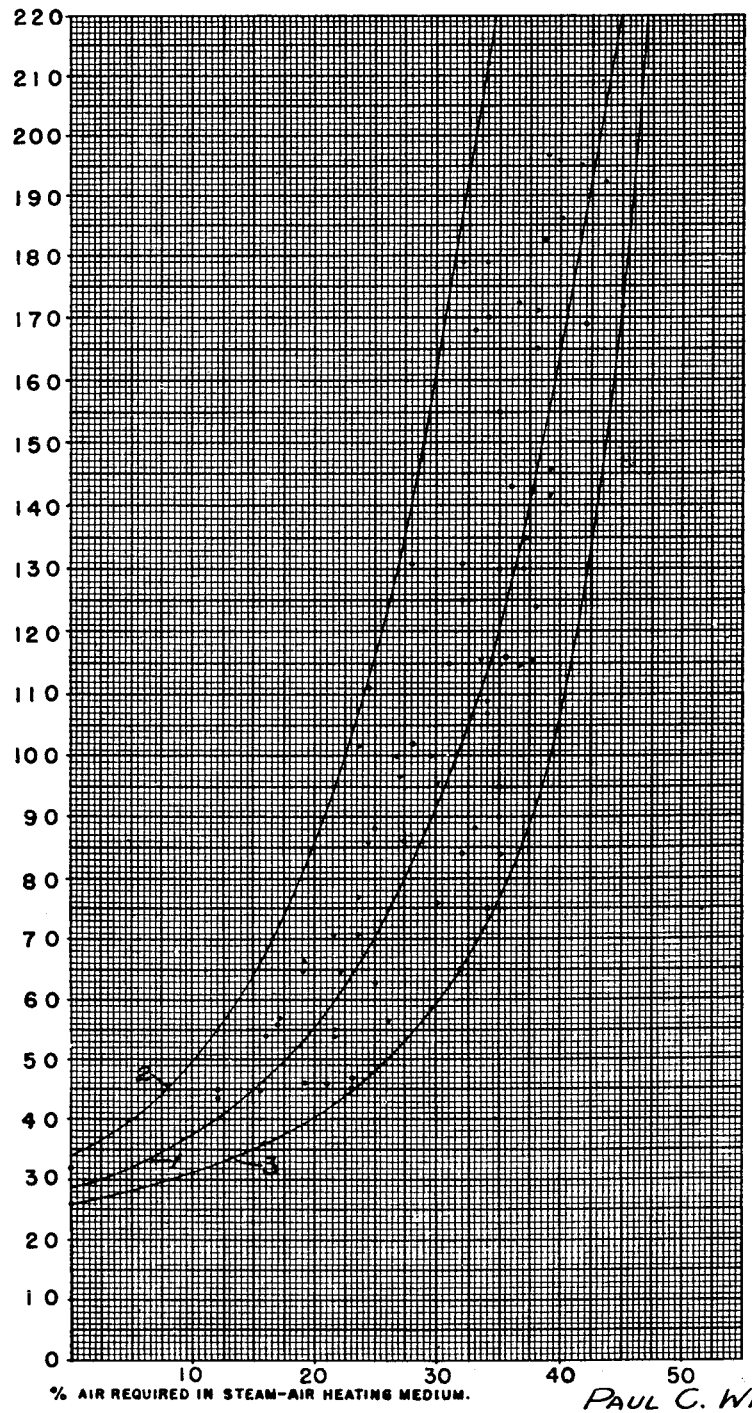

Reference is first made to the chart shown in Fig. 1 wherein the results of numerous laboratory heat treating tests with a great variety of evaporated milks in steam-air heating media of different temperatures and per cent of admixture have been graphically illustrated in accordance with well known statistical methods. The milks tested varied in heat sensitivity from the most sensitive I have been able to find to the most stable I have been able to find so that they were representative of the entire range of heat sensitivity which can be expected to be met with in practice. The non-fat solids content of these milks was representative of common commercial practice, varying from 18.46% to 18.63% by weight, the average being 18.55%.

These tests were made in steam-air media of various percentages of air and steam at various retort temperatures from 200° F. to 260° F. and various initial milk temperatures varying from 45° F. to 230° F. In carrying out each individual test for each particular milk undergoing treatment, the retort temperature (RT), the initial milk temperature at the time the milk was introduced into the heating medium (IT), and the gauge pressure of the retort containing the steam-air heating medium at which just no trace of "burn-on" occurred were tabulated. From the gauge pressure so obtained the minimum percentage of air (i. e. the per cent partial absolute pressure of the air) to prevent "burn-on" for each value of RT—IT for each particular milk was calculated by dividing the partial absolute pressure of the air by the total absolute pressure of the steam-air mixture and multiplying the result by 100. The value of each RT—IT in degrees Fahrenheit, and the minimum per cent partial absolute pressure of air in the steam-air heating medium for each RT—It necessary to prevent "burn-on" of the particular milk tested were plotted against each other on coordinate paper and the points so determined were entered on the chart of Fig. 1 and indicated in black dots thereon.

As clearly apparent from Fig. 1, the scattered points so obtained form a band-like area within which all points of no "burn-on" are located for the various milks tested at retort temperatures from 220° F. to 260° F. and initial milk temperatures from 45° F. to 230° F.

From these scattered points (scatter diagram) the following equation for the line of regression was derived by the least squares method:

$$Y = 8.929(1.07223^X) + 20$$

which equation may be expressed in logarithmic form as:

(A) $\quad \log_{10}(Y-20) = .9508 + .0303X$ wherein Y=the temperature differential (RT—IT) in degrees Fahrenheit between the heating medium or retort temperature and the initial milk temperature at which the evaporated milk in sealed cans is introduced into the heating medium; and X=the per cent partial absolute pressure of air necessary in the steam-air heating medium to prevent "burn-on" of the milk. This Equation A has been plotted in Fig. 1 and designated by the reference numeral 1.

The line of regression 1 and the above equation expressing the same represent a statistical average for all the milks tested inclusive of any variation in "burn-on" tendency of different milks. It will be seen, however, that because of the variation in the "burn-on" tendency of the different milks, a great number of the points on the scatter diagram at which just no "burn-on" occurs fall on one side or the other of the line of regression. However, all of these points fall within a band-like area which follows the general trend of the line of regression as clearly apparent from the graph in Fig. 1. The limits of this band-like area may be defined by the minimum and maximum curves designated 2 and 3, respectively, in Fig. 1.

The minimum curve 2 is the graphical representation of the following empirical equation:

$$Y_2 = 14.0(1.080^X) + 20$$

which equation may be expressed in logarithmic form as:

(B) $\quad \log_{10}(Y_2-20) = 1.146 + .0334X$ wherein X and $Y_2$ are the same as X and Y respectively in the Formula A for the line of regression 1.

The maximum curve 3 above referred to is the graphical representation of the following empirical equation:

$$Y_3 = 6.0(1.063^X) + .001(1.277^X) + 20$$

which equation may be expressed in logarithmic form as:

(C)

$$Y_3 - 20 = \log_{10}^{-1}(0.7782 + 0.0266X) + \log_{10}^{-1}(\overline{3}.0000 + 0.106X)$$

wherein X and $Y_3$ are the same as X and Y respectively in the Formula A for the line of regression 1.

Thus it will be apparent that, with evaporated milks having a non-fat solids content of 18.55%, the percentage of air necessary in the steam-air heating medium to prevent "burn-on" of the most stable of such milks at any RT—IT may be determined either directly from the chart of Fig. 1 by reference to curve 2 thereof, or by use of the Equation B. On the other hand, "burn-on" can be prevented in all milks of 18.55% non-fat solids content, including even the most sensitive by using the percentage of air indicated by curve 3 of the chart or the Equation C. (It is to be understood that the term "percentage of air" and other equivalent expressions as used above and elsewhere herein have reference to the per cent partial absolute pressure of the air.)

It may be pointed out here that the particular ranges of retort temperatures and initial milk temperatures employed in the tests depicted in Fig. 1 were selected simply as a matter of convenience and the process of my invention is not necessarily restricted thereto. It will be apparent that the curves and formulae derived from the results of the tests are applicable to heating medium temperatures below 220° F. as far as 212° F., and it is believed to be a justifiable conclusion that they are also applicable to temperatures higher than 260° F. and to values of RT—IT in excess of those actually tried.

Although the above mentioned curves and equations relate to evaporated milk having a total non-fat solids content of 18.55% by weight, I have found that any variation in the total non-fat solids content above or below 18.55% by weight, and within the range of about 12% to about 25% has a direct relation to the percentage of air needed in the steam-air heating medium to prevent "burn-on" of the milk at any selected RT—IT. From numerous tests made with milks of different non-fat solids content within the range referred to, I have found that for each 1% increase in non-fat solids content above 18.55% an additional 2.55% partial absolute pressure of air is necessary at any RT—IT to prevent "burn-on" of the milk, while for each 1% decrease in non-fat solids content below 18.55%, 2.55% less air at any RT—IT is needed to prevent "burn-on" of the milk in the steam-air heating medium of the present invention.

Therefore, to adapt the above Equations B and C for universal use in connection with evaporated milks of a non-fat solids content from about 12% to about 25%, it is necessary to include the variation in the percentage of air required by the variation in the non-fat solids content of the milk above or below 18.55% so that the following corresponding minimum and maximum equations are obtained:

Minimum equation (for 12% to 25% non-fat solids):

$$Y_2 = 14.0(1.080^{(X-2.55S+47.3)}) + 20$$

which equation may be expressed in logarithmic form as:

(B') $\quad \log_{10}(Y_2-20) = 1.146 + .0334(X-2.55S+47.3)$

Maximum equation (for 12% to 25% non-fat solids):

$$Y_3 = 6.0(1.063^{X(-2.55+47.3)}) + .001(1.277^{(X-2.55S+47.3)}) + 20$$

which equation may be expressed in logarithmic form as:

(C')

$$Y_3 - 20 = \log_{10}^{-1}[0.7782 + .0266(X-2.55S+47.3)] + \log_{10}^{-1}[\overline{3}.0000 + 0.106(X-2.55S+47.3)]$$

In the above Equations B' and C' $Y_2$ and $Y_3$ are the same as Y in the Formula A for the line of regression 1; X is the same as X in the Formula A for the line of regression 1; and S=the percentage by weight of the non-fat solids content of the particular milk undergoing treatment.

It will be apparent, therefore, that by the use of the above Equations B' and C' the minimum and maximum percentages of air necessary in the steam-air heating medium to prevent "burn-on" of all evaporated milks of 12% to 25% non-fat solids content at any RT—IT may be obtained. Thus for American Standard evaporated milk of minimum non-fat solids content (i. e., 18%), the minimum and maximum Equations B' and C' would resolve down to the following:

Minimum equation (for 18% non-fat solids):
(B'')

$$\log_{10}(Y_2-20) = 1.193 + .0334X$$

Maximum equation (for 18% non-fat solids):
(C'')

$$Y_3-20 = \log_{10}^{-1}(.8214 + .0266X) + \log_{10}^{-1}(\overline{3}.1484 + 1.06X)$$

It will be seen from the Formula C'' that when processing American Standard milk of 18% non-fat solids content air will be required to be added to the steam to prevent "burn-on" of the most sensitive milks whenever the RT—IT exceeds about 26.6° F., and Formula B'' shows that air will be required to be added to the steam for the most stable of such milks whenever the RT—IT exceeds about 35.6° F. This illustrates the necessity of maintaining the RT—IT below 35.6° F. in the prior conventional process, and explains why "burn-on" is sometimes encountered in such process when the cans are transferred from the preheater into the sterilizer even when the RT—IT is kept below this figure.

With my process, however, any values of RT—IT may be employed without danger of "burn-on" simply by adding the proper amount of air to the steam. Thus, when treating American Standard milk of 18% non-fat solids content, if it is desired to use an RT—IT in excess of about 26.6° F. the operator knows that "burn-on" can be prevented even though his milk be of the most sensitive character simply by adding to the steam the amount of air indicated by the Formula C''. On the other hand, if his milk is of the most stable character, he will only need to add air to the steam for values of RT—IT in excess of about 35.6° F., the amount required to be added being indicated by the Formula B''.

It will be understood, of course, that what has been said above in regard to the treatment of American Standard milk of 18% non-fat solids content applies equally well to milk of any other non-fat solids content within the range of from about 12% to about 25% except that the Formulae B' and C' will be used instead of the Formulae B'' and C'', and the minimum RT—IT at which air will be required to be added to the steam to prevent "burn-on" will vary in accordance with the non-fat solids content in each particular case. For example, by using the Formula C' it will be found that for the most sensitive milks of 12% non-fat solids content air will be required to be added to the steam to prevent "burn-on" when the RT—IT exceeds 36.7° F., and for the most sensitive milks of 25% non-fat solids content, when the RT—IT exceeds 22.2° F. On the other hand, for the most stable milks of 12% non-fat solids content air will be required to be added to the steam to prevent "burn-on" only when the RT—IT exceeds 71° F., and for the most stable milks of 25% non-fat solids content, when the RT—IT exceeds 24° F.

It is to be observed that under ordinary circumstances most milks encountered will neither be of the highest sensitivity nor of the highest stability but rather of an intermediate sensitivity so that the minimum amount of air required to be added to the steam to prevent "burn-on" will be somewhere between that indicated by the Formula B' and that indicated by the Formula C'. In actual practice I find it most convenient to use the amount of air indicated by the Formula C' at all times since by so doing I am assured of preventing "burn-on" in all cases, irrespective of how sensitive the milk may be, without having to determine the sensitivity of each individual batch of milk.

However, if it is desired to determine the exact minimum amount of air necessary in admixture with steam to prevent "burn-on" of the particular milk undergoing treatment at the particular RT—IT employed, this can be done by making a few tests or sample runs with several cans of the particular milk. For example, starting with a percentage of air in the steam-air heating medium, as determined by use of the Equation C', this percentage may thereupon be successively reduced for each separate run until just no "burn-on" of the milk occurs, and this percentage of air may then be used; or, if the operator prefers, he can start out by using the percentage of air indicated by the Formula B' and successively increase the amount for each separate run until the percentage is found which eliminates "burn-on." Such tests may be made from time to time on the different batches of milk to be processed and the percentage of air may be adjusted in accordance with the sensitivity or "burn-on" tendency of each batch as shown by the tests.

Thus, if the operator desires to make sure of preventing "burn-on" without going to the trouble of testing his milk for "burn-on" sensitivity, he has only to use Equation C' to determine the minimum amount of air which will be sure to prevent "burn-on" in all milks of a given non-fat solids content at any particular RT—IT. This minimum will vary of course with the non-fat solids content of the milk so that where there is any substantial variation in the non-fat solids content between different batches of milk the percentage of air content in the heating medium should be adjusted accordingly as determined by the Equation C'. On the other hand if the operator prefers to take a possible low "burn-on" tendency into consideration as well as the non-fat solids content, and to use only the minimum amount of air required to prevent "burn-on" in that one particular milk, he may test his milk as indicated in the preceding paragraph and select the proper amount of air accordingly.

The process of my invention is preferably used in commercial practice as a continuous process but may be carried out in various ways depending upon the needs or preferences of the user. Therefore, a series of examples are hereinafter set forth to illustrate not only a preferred form of procedure which I have successfully followed, as well as a preferred form of apparatus which may be used therefor, but also a few of the numerous variational procedures which it is contemplated may be followed if desired.

*Example I*

Figs. 2 to 12 inclusive illustrate the mode in which I presently prefer to carry out the process of my invention as well as a preferred form of apparatus for doing so.

In this connection it may be explained, *in limine*, that I have found that the incorporation of air into the steam has the effect of slowing down the rate of heat transfer into the cans as compared with the rate which would result from the use of steam alone at a corresponding temperature, and the more air mixed with the steam the more the rate of heat transfer is reduced. In fact it is my belief that this phenomenon is what enables me to employ higher temperature differentials than have heretofore been possible, while at the same time preventing "burn-on."

In spite of this slowing down of the rate of heat transfer, the use of my process permits an overall time reduction for the heat treatment because it makes possible the use of higher temperatures or temperature differentials than have heretofore been practical. However, I have found that an additional time saving may be effected, if desired, by employing a mixture of steam and air as the heating medium for only a part of the heat treatment, and, generally speaking, I prefer to take advantage of this saving where feasible. The equipment shown in Figs. 2 to 12 inclusive is therefore designed to effect the heat treatment in two stages, the first of which employs a steam-air heating medium and the second of which uses ordinary steam alone.

Figure 2:
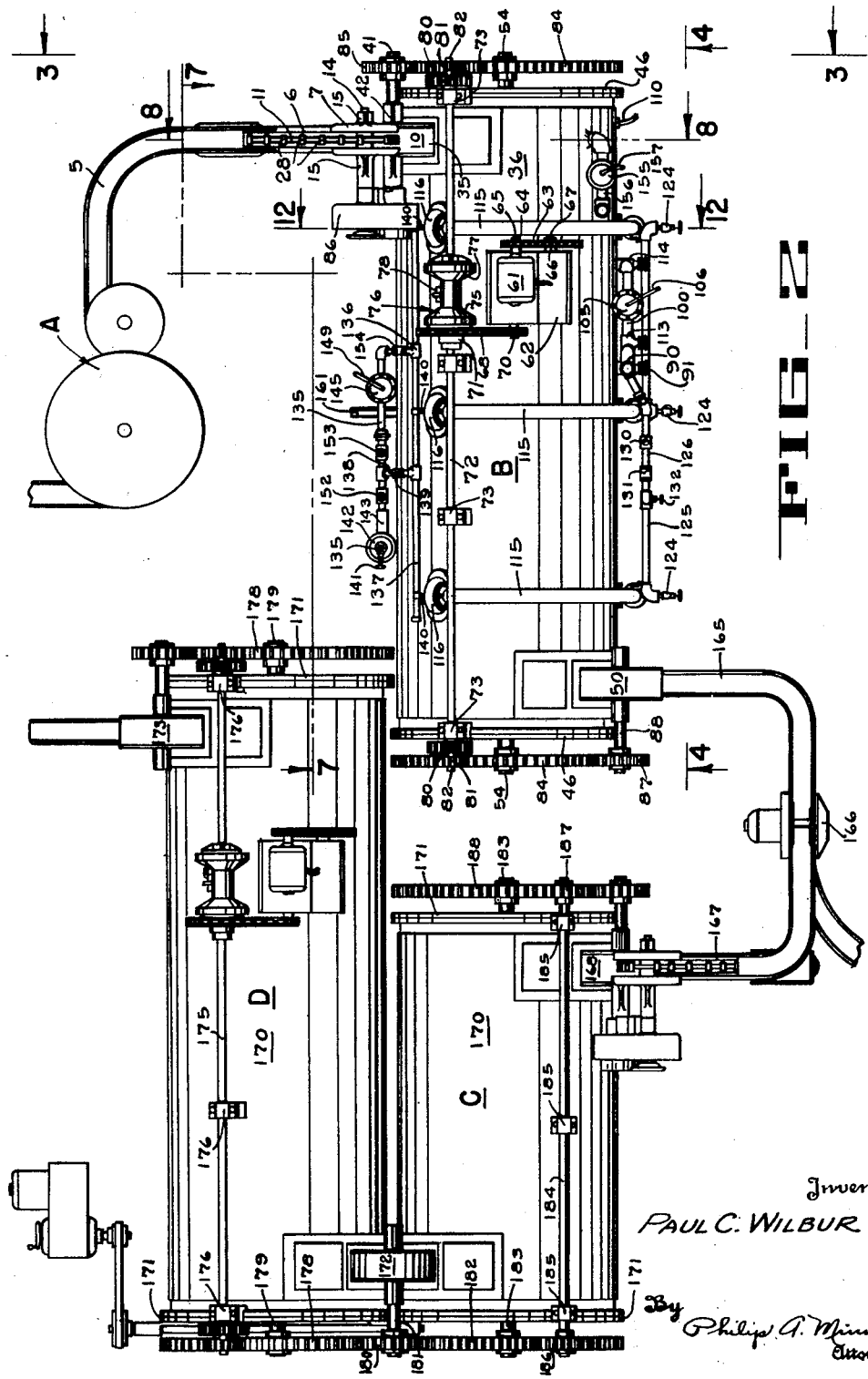
Fig. 2 is a plan view of a preferred form of apparatus for practicing the process of my invention.
Figure 3:
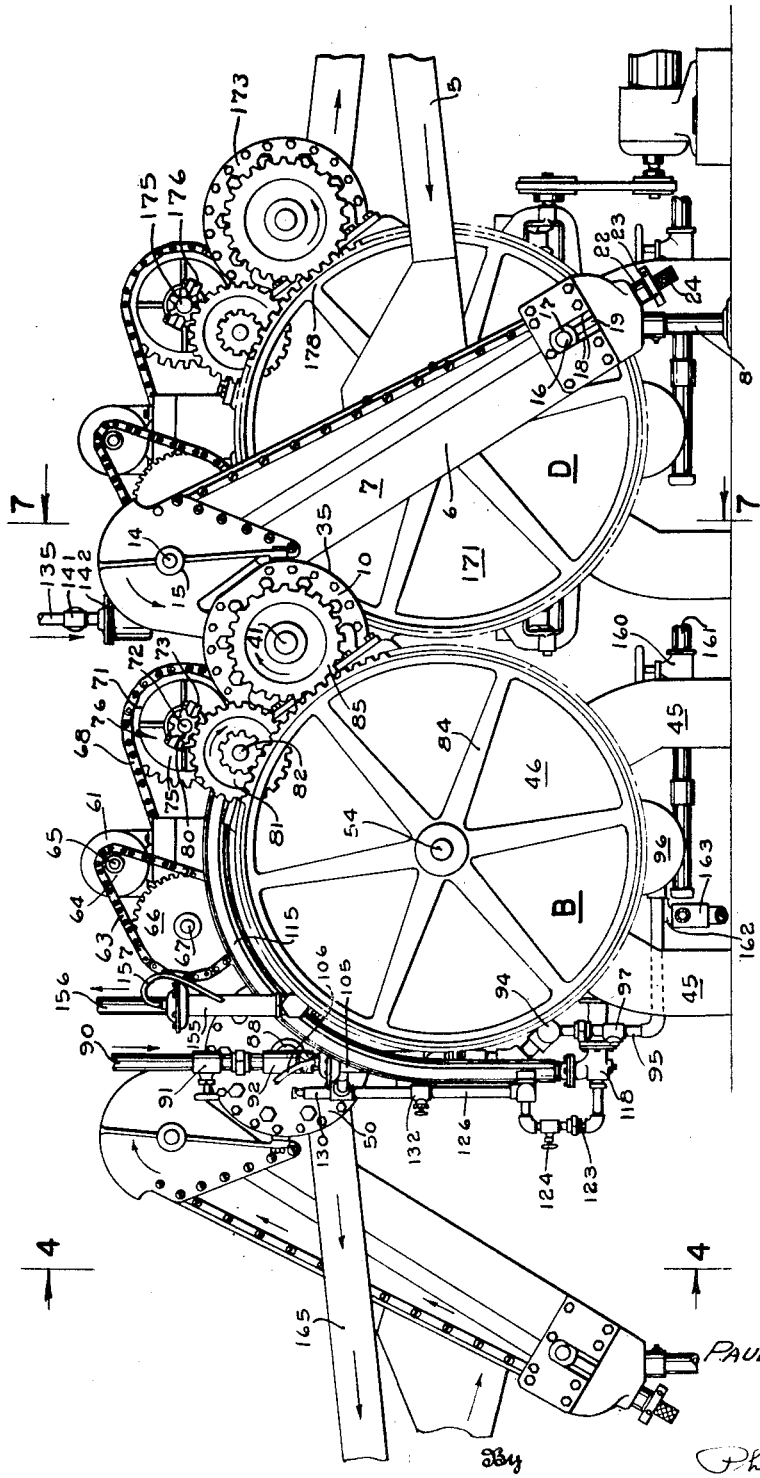
Fig. 3 is an end elevation, partially broken away, of the apparatus shown in Fig. 2 as viewed from the right hand end thereof.

Referring now to Fig. 2, the reference character A indicates a diagrammatic representation of an evaporated milk can filling and closing machine; B indicates a pressure heater or retort into which the cans are delivered from the filling machine A and in which they are subjected to an initial heat treatment by means of a steam-air heating medium; C indicates a pressure sterilizer into which the cans are passed from the pressure heater B and in which the sterilization of the milk is completed by the use of steam alone; and D is a pressure cooler through which the cans are passed from the sterilizer C and in which the milk is cooled down to approximately room temperature by the time the cans are discharged therefrom.

In the arrangement illustrated, the filling and closing machine A may be of any suitable design adapted to receive a procession of empty cans, fill them with evaporated milk, and hermetically seal the filled cans. Such machines are well known to the art so that a more detailed illustration or description is deemed unnecessary. The milk sealed into the cans in this machine may be at any temperature desired, but for purposes of this disclosure will be assumed to be at a temperature of 50° F. The filled and sealed cans discharged from the filling machine A are received in the usual manner by an inclined gravity chute diagrammatically indicated at 5 which delivers them in single file rolling procession to the feed elevator 6 of the pressure heater B.

This elevator 6 (see Figs. 3 and 7 to 11 inclusive) comprises a housing 7 having its lower end supported by a pedestal 8 and its upper end secured to the casing of an inlet valve assembly 10 hereinafter to be described. Within the elevator housing 7 is arranged an endless conveyor chain 11 trained around an upper sprocket 12 and a lower sprocket 13. The upper sprocket 12 is keyed to a drive shaft 14 journalled in bearings 15 formed on the housing 7 and is driven in a manner presently to be described so as to cause the elevator chain to travel in the direction indicated by the arrow 11a in Fig. 8. The lower sprocket 13 is secured to an idler shaft 16 journalled in floating bearings 17 which are slidably mounted in slots 18 formed in the side walls of the housing 7.

The floating bearings 17 are secured to the free ends of a yoke 19 having a screw shaft 20 projecting therefrom through an opening in the lower end of the housing 7. A coil spring 21 surrounds the shaft 20 within a cylindrical retainer box 22 formed on the housing 7, and a nut 23 on the shaft 20 bears against one end of the spring and serves to adjust the spring tension on the yoke 19 so as to hold the chain 11 under whatever tension desired. The nut 23 is held in adjusted position by a sleeve type lock nut 24 threaded onto the yoke shaft 20.

The elevator chain 11 is provided at regular intervals with pairs of outwardly projecting opposed brackets 26 interconnected by axle pins 27 on which can pusher rollers 28 are freely journalled. The pusher rollers 28 are so spaced as to form individual can receiving pockets between them and the cans delivered into these pockets from the gravity chute 5 are rollingly supported by the flanges of angle iron guides 30 secured to the housing 7. Upon reaching the upper end of the elevator the cans are pushed around a curved section of the angle iron guides 30 and onto stripper guides 31 (see Figs. 9 and 10) formed on a bracket 32 secured to the inside of the housing 7.

The stripper guides 31 are spaced apart, as shown, to permit the pusher brackets and rollers 26 and 28 to pass between them and at the same time transfer the cans into the inlet valve assembly 10 by which they are introduced into the interior of the pressure heater B. A chain support 33 formed on the bracket 32 serves to prevent inward flexing of the chain 11 as the pusher rollers pass through the transfer zone so that if a pusher roller is required to exert pressure on a can to force it over the stripper guides 31 into the valve assembly 10, as occasionally happens with an ill-formed or slightly mispositioned can, the pusher roller will not be canted out of its normal position required for properly timed transfer of the can into the valve assembly.

The inlet valve assembly 10 (see Fig. 8) may be of conventional construction similar to that shown in U. S. Reissued Letters Patent to A. R. Thompson No. 15,334, dated April 11, 1922. Generally described, it comprises a valve casing 35 secured in pressuretight relation to the shell 36 of the pressure heater B and provided with an inlet opening 37 through which the cans are received from the elevator 6, and a discharge opening 38 through which the cans are discharged into the pressure heater. Within the valve casing 35 is a rotary turret valve 40 secured to a drive shaft 41 journalled in bearings 42. The valve 40 is provided with a series of can receiving pockets 43 and is driven by means presently to be described in the direction indicated by the arrow 40a (Fig. 8) and in timed relation with the elevator 6 so that as each can is stripped from between the pusher rolls of the elevator it is receinved in one of the valve pockets 43 and is carried around until it is discharged by gravity into the interior of the pressure heater B through the discharge opening 38. Suitable packing means (not shown) such as illustrated in the aforesaid Thompson Reissue Patent No. 15,334 are provided to insure pressuretight relation between the valve and its casing so as to prevent loss of pressure from the interior of the pressure heater B through the valve assembly.

The pressure heater B is made up of the cylindrical shell 36 supported on legs 45 and tightly closed at its ends by means of closure heads 46 so as to provide a pressuretight treating chamber therewithin. At the inlet end of the pressure heater B the shell 36 is provided with an inlet opening 47 through which the cans are received from the inlet valve assembly 10; and at the discharge end of the heater the shell is similarly provided with an outlet opening through which the cans are discharged into a discharge valve assembly 50 which is similar in construction to the inlet valve assembly 10 and therefore need not be further described.

The mechanism for conveying the cans through the pressure heater B (see Fig. 7) is of the so called "reel and spiral" construction and is preferably like that illustrated in U. S. Letters Patent to A. R. Thompson No. 2,211,801 dated August 20, 1940. It comprises a helix-like T-iron guide track 51 secured to and extending around the inside wall of the shell 36 from the inlet opening 47 to the discharge opening so as to form a generally helically trending canway for guiding the cans from the inlet opening to the discharge opening. The cans are advanced along this canway by means of a rotary reel 52 made up of a plurality of spaced spider wheels 53 secured to a central drive shaft 54 and carrying a series of angle iron pusher bars 55 on their peripheries so as to form a series of can channels 56 on the outer periphery of the reel extending longitudinally thereof.

The foregoing arrangement is such that as the cans drop from the inlet valve 40 through the inlet opening 47 they are received in the can channels 56 of the reel 52, and, as the reel rotates, the helically trending T-iron guide 51 engages the ends of the cans and shifts them endwise until they reach the discharge opening. At this point the cans are pushed from between the pusher bars 55 into the discharge valve assembly 50 by means of the usual ejector or star wheel 57 (Figs. 7 and 12) which intermeshes with and is driven by the pusher bars 55. The base flanges of the pusher bars 55 are cut away as indicated at 55a to permit the teeth of the ejector wheel to project between the bars, and the cans are prevented from dropping through these cut away portions as they approach the ejector wheel by means of a semi-circular supporting plate or platform 58 supported by brackets 58a secured to the inner wall of the pressure heater wall 36 just beyond the ends of the pusher bars. The star wheel 57 is journalled on a stub shaft 59 secured to a bracket 60 which is also secured to the inner wall of the pressure heater shell just beyond the ends of the pusher bars.

The drive mechanism (see Figs. 2, 4, 7 and 8) for the reel 52, inlet and discharge valve assemblies 10 and 50, and the elevator 6, comprises an electric motor 61 mounted on the casing 62 of a conventional variable speed power transmission unit secured to the top side of the pressure heater shell 36. A drive chain 63 is trained around a sprocket 64 secured to the motor shaft 65 and drives a sprocket 66 secured to the power input shaft 67 of the transmission unit. Another chain 68 is trained around a sprocket 69 secured to the power take-off shaft 70 of the transmission unit and drives a sprocket 71 loosely journalled on the main drive shaft 72 which is in turn journalled in a plurality of bearings 73 secured to the top of the pressure heater shell.

The sprocket 71 is secured to one of the clutch elements of the clutch unit 75 forming part of a combined clutch and brake assembly 76 in which the brake unit is indicated at 77. Since this clutch and brake assembly is of conventional construction it is deemed unnecessary to describe it in detail. Suffice it to say that such clutch and brake assembly is actuated by a lever 78 and the arrangement is such that when the lever is shifted in one direction the brake unit 77 is disengaged and the clutch unit 75 is engaged to transmit power from the sprocket 71 to the main shaft 72. When the lever 78 is shifted in the other direction the clutch unit 75 is disengaged so as to disconnect the shaft 72 from the sprocket 71 and the brake unit 77 is engaged to prevent continued rotation of the shaft by the momentum of the mechanism associated with it.

Each end of the main drive shaft 72 is provided with a pinion 80 intermeshing with the larger gear of a double gear 81 secured to a stab shaft 82 journalled in a bracket 83 secured to the heater shell. The smaller gears of the double gears 81 intermesh with bull gears 84 secured to the ends of the reel shaft 54 which project outwardly from the pressure heater. With this arrangement power is applied to both ends of the reel shaft so as to prevent twisting of the reel under the heavy loads to which it is subjected.

The inlet valve 40 is driven from the adjacent bull gear 84 by means of a pinion 85 secured to one of the ends of the valve shaft 41 which project outwardly from the valve casing 35. The other end of the valve shaft 41 projects into a gear casing 86 within which is a train of gears (not shown). This train of gears is driven from the valve shaft 41 and in turn drives the shaft 14 of the elevator sprocket 12 so as to drive the elevator chain 11. The valve in the discharge valve assembly 50 is driven from the bull gear adjacent the discharge end of the machine by means of a pinion 87 secured to the discharge valve shaft 88.

For supplying steam to the pressure heater B a steam supply line 90 (see Fig. 4) provided with a manually controlled master valve 91 leads from any suitable steam boiler (not shown) capable of generating and maintaining steam under pressure at or above that required to obtain the desired temperature at which the pressure heater is to be operated. The steam supply line 90 is also provided with a strainer 92 of conventional construction which serves to trap and remove solid particles such as pieces of boiler scale or grit which may be entrained with the steam so as to prevent such particles from entering and perhaps interfering with the operation of certain automatic regulators hereinafter referred to.

The steam supply line 90 connects through a manually controlled valve 93 with a distributor pipe 94 extending longitudinally of the pressure heater and to which is connected a series of riser pipes 95 through which latter pipes the steam is directed into the interior of the pressure heater at a plurality of points to insure uniformity of steam supply to all portions of the heater. The riser pipes 95 are conveniently tapped into the usual collecting trough 96 which is formed on the bottom of the heater shell 36 and in open communication with the interior thereof for the purpose of receiving and facilitating the removal of condensate, trash and contents of ruptured cans which may drop down into it through the openings between the convolutions of the T-iron guide rail 51.

The riser pipes 95 may be provided with manually controlled valves 97 for use in the event it is ever desired for any reason to cut off the flow of steam through any of them but ordinarily these valves are all left open. The valve 93 in the steam supply line 90 is, however, normally closed so that the steam is supplied to the distributor pipe 94 through a by-pass pipe line 100 connected to the supply line through a T-fitting 101 just ahead of the valve 93 and connected to the distributor pipe through a T-fitting 102.

The flow of steam through the by-pass line 100 is automatically controlled to supply just the proper quantity to maintain the desired temperature within the pressure heater B. This is accomplished by means of a diaphragm type reverse acting air operated regulating valve 105 inserted in the by-pass line 100 and actuated by compressed air introduced through a pipe 106 leading from an automatic temperature control apparatus which operates to regulate the air supply to the regulating valve in accordance with the temperature in the pressure heater.

Such regulating valves and automatic control apparatus are well known and in common use in this art so that a detailed description thereof is deemed unnecessary. The arrangement is however, diagrammatically illustrated in Fig. 5 wherein the temperature controller, which may be of the recording type, is indicated at 107. Compressed air is supplied to the controller from any suitable source of supply through a pipe 108 provided with a conventional self-acting pressure regulating valve 109. The quantity of air admitted by the controller from the pipe 108 into the pipe 106 is regulated by suitable mechanism within the controller which is actuated by a heat responsive fluid confined within a tube 110 and closed bulb 111 which latter projects into the heater through an opening 112 adjacent the inlet end of the heater so as to be exposed to the temperature therewithin.

It will be understood that the controller 107 is adjustable so that it may be set for any desired temperature and when so set any variation in the temperature within the pressure heater immediately acts on the controller through the medium of the heat responsive fluid in the bulb 111 and tube 110 to cause the controller to vary the amount of air passed through it from the pipe 108 to the pipe 106 and thereby actuate the regulating valve 105 to restrict or increase the flow of steam through the by-pass line 100 to compensate for such temperature variation. In this manner the temperature within the pressure heater is constantly maintained at whatever temperature the controller 107 is set for. Manually controlled valves 113 and 114 in the by-pass line 100 are normally open but may be closed to permit the removal of the regulating valve 105 for emergency repairs or replacement without loss of steam pressure from the pressure heater.

As hereinbefore mentioned, air is also introduced into the pressure heater to mix with the steam and form the desired steam-air heating medium, and it is desirable that this mixture be maintained as uniform as possible throughout the heater so as to prevent stratification or the possible formation of local air or steam pockets such as might result in lack of uniformity of the heat treatment or cause occasional "burn-on." I have therefore provided for continuous automatic circulation and agitation of the heating medium and the means for accomplishing this is best seen in Figs. 4, 8 and 12.

It will be observed that conduits 115 extend over and partially around the shell of the heater at spaced locations throughout its length, there being three of these in the illustrated embodiment although more or less of them could be employed according to preference. The upper end of each of these conduits communicates with the interior of the pressure heater through an elbow 116 secured in pressuretight relation to the heater shell over an opening 117 in the shell. At their lower ends each conduit 115 connects with a steam injector 118 arranged to discharge into the heater through an opening 119 in the side wall of a squared offset portion 120 of the heater shell 36.

Steam is continuously supplied to nozzles 122 in the injectors 118 by pipes 123 provided with manually controlled valves 124 and leading from an auxiliary distributor pipe 125 to which steam is supplied through a pipe line 126. The latter is connected to the pipe line 90 through a T-fitting 127 and is provided with a self-acting pressure responsive pressure regulating valve 130 of conventional construction which serves to regulate the flow of steam through said pipe line so as to insure a constant pressure steam supply to the injectors 118. The pipe line 126 is also provided with a pressure indicating gauge 131 and a normally open manually controlled valve 132.

By the construction so far described it will be seen that the injector nozzles 122 are supplied with steam at constant pressure so as to create and maintain a circulation of the heating medium from the interior of the pressure heater into the elbows 116 and thence through the conduits 115 and back into the heater through the injectors. It is also to be observed that the flow of steam into the pressure heater through the injector nozzles 122 is entirely independent of the main steam supply through the pipe line 100, distributor pipe 94 and risers 95. Thus the injectors are in constant operation and continue to operate even when the temperature within the heater is at the desired point and the main steam supply is temporarily cut off by the regulating valve 105. The circulation of heating medium through the conduits 115 is therefore continuously maintained at all times during operation of the machine and it serves to keep the heating medium in the heater in a constant state of agitation so as to distribute the air uniformly throughout the treating chamber and maintain the uniformity of the mixture.

It may be explained here that the continuous operation of the injectors will not normally cause any rise in temperature within the heater above that at which the regulating valve controller 107 is set. The reason for this is that the injector nozzles 122 are not large enough to admit sufficient steam to compensate for the various heat losses such as leakage, radiation through the heater shell, withdrawal of heating medium by the inlet and discharge valve pockets, absorption of heat by the cans passing through the heater and by air introduced into the heater by the valve pockets, etc. In fact I prefer to limit the size of the injector nozzles so that, under the pressure conditions determined by the setting of the pressure regulating valve 130, they will supply just slightly less steam than necessary to compensate for the heat losses when the heater is idle, i. e., no cans flowing through it and the reel and valves stationary. With the pressure heater illustrated, which is uninsulated as customary, I have found that the size of the injector nozzles may be so limited and yet be large enough to create the desired amount of circulation and agitation of the heating medium, and such nozzles are therefore employed. Thus, in the event it should become necessary or unavoidable to interrupt the operation of the heater, as in the case of a power failure or breakdown of other equipment in the line, the jets will continue to operate without causing any temperature rise in the heater and the proper conditions will be maintained in it.

Compressed air is supplied to the pressure heater by a pipe line 135 (see Fig. 7) leading from any suitable source of air supply capable of supplying air in sufficient quantities and at the pressure necessary to maintain the desired proportion of air in the steam-air heading medium in the heater. The air supply line 135 is connected at 136 to a distributor pipe 137 extending longitudinally of the pressure heater, and a by-pass pipe 138 provided with a normally closed manually controlled valve 139 also connects the air supply pipe with the distributor pipe 137. Branch pipes 140 leading from the distributor pipe 137 open into the elbows 116 to direct the air through the elbows in the direction of conduits 115.

By this arrangement it will be seen that the air is not introduced directly into the shell of the pressure heater but enters by way of the conduits 115 due to the slightly lowered pressure in these conduits induced by the injectors 118. This affords an opportunity for the air to become thoroughly mixed with the steam before it enters the heater and at the same time warms up the air so that no local cold spots are created in the heater.

The air supply line 135 is provided with a manually controlled master valve 141, an oil separator 142, and a strainer 143, all of which are of conventional construction. The oil separator 142 serves to remove any entrained oil from the air so that it will not enter the pressure heater and foul the cans passing therethrough. The strainer 143 removes grit and other solid particles from the air.

The flow of air through the supply line 135 is automatically controlled to supply just the proper quantity to maintain the desired total pressure within the pressure heater and consequently the desired proportions of the air-steam mixture. This is accomplished by means of a diaphragm type reverse acting air operated regulating valve 145 which is inserted in the air supply line and is of the same construction as the regulating valve 105 previously referred to. The regulating valve 145 is also actuated by an automatic control mechanism similar to that associated with the regulating valve 105, except that in this case the control mechanism is responsive to the pressure within the pressure heater instead of the temperature.

The type of automatic pressure control mechanism just referred to is also well known and in common use in this art so that a detailed description thereof is unnecessary, but the arrangement is diagrammatically illustrated in Fig. 6. In this figure, 146 indicates the pressure controller, which is illustrated as being of the recording type, and to which compressed air is supplied from any suitable source through a pipe 147 provided with a conventional pressure responsive self-acting pressure regulating valve 148. The quantity of air admitted by the controller from the pipe 147 into the pipe 149 through which it flows into the regulating valve 145 to actuate it is regulated by suitable mechanism within the controller which is actuated by the pressure within the pressure heater transmitted to the controller through a tube 150 opening through the shell 36 of the heater adjacent its inlet end.

The pressure controller 146 is adjustable so that it may be set for any desired pressure and when so set any variation in the pressure within the pressure heater is immediately transmitted to the controller through the tube 150 to cause the controller to vary the amount of air passed through it from the pipe 147 to the pipe 149 and thereby actuate the regulating valve 145 to restrict or increase the flow of air through the pipe line 135 to compensate for such pressure variation. In this manner the total pressure within the pressure heater is constantly maintained at whatever pressure the controller 146 is set for. It will be understood, of course, that the controller 146 is set for a higher pressure than the pressure of steam at the temperature for which the controller 107 is set so that air is admitted into the pressure heater until the total combined pressure of the steam and air is that required for the desired proportioning of the mixture.

The air supply line 135 is also provided with a conventional pressure responsive self acting pressure regulating valve 152 located just ahead of the regulating valve 145. The reason for this is that air pressure from the average source of supply is apt to vary within fairly wide limits and as diaphragm type regulating valves such as that indicated at 145 are rather sensitive in their operation it is desirable to keep the pressure of the air supply within reasonably close limits to prevent the regulating valve from "hunting." This is accomplished by the self-acting regulating valve 152. Manually controlled valves 153 and 154 in the air supply line 135 are normally open but may be closed to permit the removal of the regulating valve 145 for emergency repairs or replacement without loss of pressure from the pressure heater. When these valves are closed, the valve 139 in the by-pass pipe 138 may be operated to regulate the air supply by hand if desired until the regulating valve 145 is again put into operation.

In addition to the control mechanisms hereinabove described, the pressure heater B is also provided with a master pressure regulating blow-off mechanism for preventing excessive rise in pressure (and, consequently, temperature also) in the event of abnormal circumstances such that the regulating valves 105 and 145 should fail to maintain the temperature and pressure conditions for which their controllers are set. Such circumstances might be met with, for example, if either of the regulating valves 105 and 145 should fail to seat tightly when closed and thereby allow steam or air to flow into the heater in excess of the heat or air losses; or in the event that the operation of the heater reel should be interrupted and during such interruption the heat losses should, for any reason, become less than the heat supplied by the injector nozzles 122.

The master pressure regulating blow-off mechanism referred to comprises a diaphragm type direct acting air operated regulating valve 155 inserted in a blow-off pipe 156 tapped into the upper portion of the pressure heater shell. The regulating valve 155 is of the same construction as the regulating valves 105 and 145 hereinbefore referred to except that it normally closes the pipe in which it is inserted and the air introduced into it through the pipe 157 serves to open it instead of to close it. This type of regulating valve is also of conventional and well known construction and needs no description. The supply of compressed air to the regulating valve 155 through the pipe 157 is controlled by an automatic control mechanism identical in all respects with that illustrated in the diagram of Fig. 6, and having its pressure receiving tube tapped into the pressure heater adjacent its inlet end at 158.

The controller for the regulating valve 155 is set to operate at a pressure slightly higher (one or two pounds for example) than the controller for the regulator 145 so that normally it is inoperative and maintains the blow-off pipe 156 closed. Should the pressure in the pressure heater rise, however, beyond that for which the controller 146 is set, then the controller for the regulating valve 155 will open it and allow the escape of heating medium so as to prevent the pressure (and, consequently, the temperature also) from rising to a harmful extent. At the same time the escape of heating medium serves as a warning that the heater is not operating in accordance with the conditions for which the air and steam supply controls are set, and in order to bring it back into proper operating conditions the operator may manipulate the manually controlled valve 160 in a blow-off pipe 161 leading from the collecting trough 96 to bring the pressure down to the point where the automatic controls take over again and in this way maintain the desired conditions in the heater until the abnormal circumstances which caused the improper operation are rectified. In the event it is desired to maintain a water level in the preheater, the blow-off pipe 161 may be tapped into the shell of the heater at a point above the desired water level instead of into the collecting trough 96 so as to avoid discharge of water when the valve 160 is opened.

It will be understood that the addition of the proper amount of air to the steam functions to prevent "burn-on" only during the time the cans of milk are in contact with the steam-air mixture. Therefore, if any water bath is maintained or allowed to accumulate in the pressure heater to a sufficient depth that the cans are immersed or dipped into it during their travel through the heater, and if the depth and temperature of such water bath is such as would otherwise result in "burn-on" during the time the cans are in it, then the presence of the air in the steam-air mixture maintained above the bath will not prevent such "burn-on."

It will be apparent, of course, that the length of time the cans are in any water bath in the preheater will depend upon the depth of such bath and, further, that whether "burn-on" will or will not occur while the cans are in it, and if so, to what extent, will depend not only upon such time but also upon the temperature of the bath. The precise amount of water which can be permitted to be in the heater without causing "burn-on" is accordingly variable, depending upon the particular circumstances of each individual case. It may be stated, however, that in actual tests on American Standard milk with the pressure heater B as illustrated, I have found that some "burn-on" is likely to result if a water bath having a temperature approximately that of the steam-air heating medium is maintained or permitted to accumulate in the heater to a depth in excess of that which causes the lowermost can in the reel to be fully immersed in it, and the greater the depth of such water bath the heavier the "burn-on" will be. It is, therefore, necessary to provide suitable mechanism for preventing or limiting the accumulation of water in the preheater in sufficient quantity to cause undesirable "burn-on" in spite of the use of the steam-air mixture.

Generally speaking, the use of a water bath in the pressure heater B is neither necessary nor advantageous. On the other hand it has the disadvantage of accelerating corrosion of the mechanism coming into contact with it, due to the presence of so much air in the heating medium. Therefore I prefer to operate the heater without any water in it. It may also be stated here that the cans were not allowed to project into or become immersed in a water bath in any of the laboratory tests on which the chart of Fig. 1 is based.

In order to prevent the accumulation of water in the pressure heater B I provide a drain pipe 162 leading from the collecting trough 96 adjacent its bottom to any suitable point of discharge and provided with a conventional steam trap 163 which serves in well known manner to permit the flow of water therethrough but prevents steam or air from passing through it. With this arrangement any condensate collecting in the trough 96 is immediately drained off so that water is not allowed to collect in sufficient quantity to reach the cans undergoing treatment. However, if for any reason it should be desired to maintain a small depth of water in the heater it will be understood that the pipe 162 may be tapped into the heater shell at the level which it is desired to maintain.

The cans of milk discharged from the pressure heater B through the discharge valve assembly 50 are received in rolling procession by a gravity chute 165 which directs them through a leaky can separator 166 to an elevator 167 which delivers them into the inlet valve assembly 168 of the sterilizer C. The leaky can separator 166 is of conventional construction corresponding to that shown in U. S. Letters Patent to A. R. Thompson No. 1,485,895 dated March 4, 1924. The elevator 167 and inlet valve assembly 168 are identical with the elevator 6 and inlet valve assembly 10 associated with the pressure heater B.

The sterilizer C and cooler D are entirely of conventional construction so that a detailed illustration and description is believed unnecessary. Each comprises a pressuretight shell 170 (see Fig. 2) closed by end heads 171 and the cans are conveyed through the sterilizer by a "reel and spiral" mechanism identical in all respects to that shown in the pressure heater B. The can conveying mechanism in the cooler is also of the "reel and spiral" type but preferably embodies an initial shaking section such as illustrated in U. S. Letters Patent to A. R. Thompson No. 2,337,784 dated December 28, 1943. The cans are transferred from the sterilizer into the cooler by a transfer valve assembly 172 of the construction shown in U. S. Letters Patent to A. R. Thompson No. 1,467,960 dated September 11, 1923 and they are discharged from the cooler through a discharge valve assembly 173 of the same construction as the discharge valve assembly 50 on the pressure heater B. An ejector wheel similar to 57 is disposed in the sterilizer to introduce the cans into the transfer valve assembly 172 and another ejector wheel of the same character is employed in the cooler to introduce the cans into the discharge valve assembly 173.

The reels in the sterilizer C and cooler D are driven in synchronism by a drive mechanism mounted on the cooler and of the same construction as that provided on the pressure heater B. As shown, the main drive shaft 175 journalled in suitable bearings 176 on the cooler corresponds to the drive shaft 72 on the pressure heater B, and is similarly geared to bull gears 178 on the outwardly projecting ends of the shaft 179 which extends through the cooler and drives the reel therewithin. A gear 180 secured to an outwardly projecting end of the shaft 181 of the transfer valve assembly 172 meshes with the adjacent bull gear 178 and also with the bull gear 182 carried on one end of the shaft 183 of the sterilizer C which carries and drives the reel therewithin. In this manner the reels in the sterilizer and cooler and the transfer valve assembly 172 are all driven in synchronism. A shaft 184 journalled in suitable bearings 185 on the sterilizer C is provided with a pinion 186 at one end meshing with the bull gear 182 and a pinion 187 at the other end meshing with a bull gear 188 on the reel shaft 183 so as to transmit power to both ends of the reel and prevent twisting thereof.

The sterilizer C is supplied with steam under the proper pressure to secure and maintain the desired sterilizing temperature therewithin but it is not supplied with air as in the case of the pressure heater B. For the sake of simplicity the steam supply for the sterilizer C has been omitted from the drawings but it may be said that it is just like that shown on the pressure heater B except that the injectors 118 and the piping leading thereto from and including the T-fitting 127 are omitted. It will be understood that the sterilizer C does not embody either the circulating conduits 115 such as are applied to the pressure heater B or the air supply mechanism associated therewith. The sterilizer B also does not have a blow off regulating valve corresponding to the regulating valve 155 on the pressure heater B.

The cooler D is kept supplied with a body of cooling water therein which is continuously changed so as to maintain it at the proper temperature to cool the cans down to approximately room temperature by the time they are discharged through the discharge valve assembly 173. Compressed air is also introduced into the cooler so as to maintain the cans under pressure as they pass into and through the cooling chamber and thereby prevent them from bursting under the internal pressure previously generated within them during the prior heat treatment. The mechanism for supplying and maintaining the cooling water and air within the cooler D is of conventional construction and hence has been omitted from the drawings for the sake of simplicity. However, such mechanism is illustrated in U. S. Letters Patent to A. R. Thompson No. 1,432,924, dated October 24, 1922, to which reference is made for further details.

To illustrate the operation of the described apparatus in accordance with my method, let it be supposed that cans of milk having a non-fat solids content of 18.55% are coming from the filling and closing machine A at a temperature of 50° F. and it is desired to subject them to a temperature of 225° F. maintained in the pressure heater B. The RT—IT is therefore 175° F. and the percentage of air necessary in the steam-air heating medium in the pressure heater to prevent "burn-on" of all milks having a non-fat solids content of 18.55% at this RT—IT will be found from curve 3 in the chart of Fig. 1, or by the use of the Equation C to be 45.1%. A steam-air heating medium composed of 54.9% steam and 45.1% air may therefore be used without fear of "burn-on," and the total gauge pressure of such a medium will be 19.7 lbs. per sq. in. That this will be the total gauge pressure will be obvious from known laws of partial pressures of gas mixtures. Thus it is known that the absolute pressure of steam at 225° F. is 18.91 lbs. per sq. in., and since the steam is to form only 54.9% of the mixture, the total absolute pressure of the mixture must be $$\frac{18.91}{.549} \text{ lbs. per sq. in.}$$

which is 34.4 lbs. per sq. in. absolute pressure, or 19.7 lbs. per sq. in. gauge pressure.

To form and maintain this mixture in the pressure heater B the controller 107 is set at a temperature of 225° F.; the controller 146 is set at a pressure of 19.7 lbs. per sq. in.; the controller for the blow off regulating valve 155 is set at a pressure of 21 or 22 lbs. per sq. in.; and the master valves 91 and 141 are opened up. It will be understood that the valves 93 and 139 are closed and all the other manual valves on the machine are open.

With the controllers 107 and 146 set as aforesaid, the opening of the master valve 91 causes steam to be admitted through the pipe lines 90 and 100 to the distributor pipe 94 and thence into the pressure heater through the riser pipes 95 until the temperature within the heater reaches 225° F., after which the controller 107 will automatically operate the regulating valve 105 to regulate the further admission of steam so as to maintain this temperature within the heater. At the same time steam is also admitted through the pipe line 126 to the auxiliary distributor pipe 125 and thence into the pressure heater through the injectors 118, thereby setting up a circulation through the conduits 115.

Simultaneously with the admission of the steam, the opening of the master valve 141 causes compressed air to be admitted through the pipe line 135 to the distributor pipe 137 and thence into the pressure heater by way of the branch pipes 140, conduits 115 and injectors 118 until the total gauge pressure within the heater reaches 19.7 lbs. per sq. in. thereby creating the desired steam-air mixture within the heater of 54.9% steam and 45.1% air. Thereafter the controller 146 and its associated regulating valve 145 will automatically control the further admission of air so as to maintain this total pressure within the heater, and the action of the controller 146 and its regulating valve 145 in maintaining this total pressure conjointly with the action of the controller 107 and its regulating valve 105 in maintaining the temperature within the heater, serves to maintain the steam-air mixture in the proportions of 54.9% steam and 45.1% air.

It will be seen from the foregoing that the cans of milk coming from the filling and closing machine A are introduced at their filling temperature of 50° F. directly into the steam-air heating medium in the pressure heater having a temperature of 225° F., and they are subjected to this latter temperature throughout their travel through the heater. The length of the heater is preferably such that the cans complete their passage therethrough and are transferred into the sterilizer C just shortly before the milk has been brought up to the temperature maintained in the heater. In this connection it may be observed that the closer the milk temperature approaches the temperature of the heating medium the slower its temperature increases. In actual practice therefore, time may be saved if the milk is brought up to only approximately the temperature of the heating medium, and I prefer to bring it up to about 7° F. below the actual temperature of the medium. It will be understood, of course, that the cans may be left in the heater long enough to raise the milk temperature somewhat closer to the temperature of the heating medium if desired, and in that case the length of the heater or the speed of its reel would be adjusted accordingly.

I have found by actual tests with the pressure heater B as illustrated that the time required, under the above described conditions, for the cans to be in it until their temperature approximates 218° F. will be about 9.4 minutes. I have also found in the actual operation of this pressure heater that the proportions of steam and air in the steam-air heating medium necessary to prevent "burn-on" conform to the Equations B and C and the chart shown in Fig. 1.

As before pointed out the pressure sterilizer C is filled with steam to which no air has been added, or, if desired, it may be partly filled with such steam and partly with water, and the cans are subjected to the temperature of this steam, or steam and water, throughout their passage through the sterilizer.

The temperature maintained in the sterilizer C may be higher than that to which the cans are heated in the pressure heater B, although, as may be seen from the chart of Fig. 1, the temperature differential must not exceed 26° F. for the more sensitive milks, or 34° F. for the more stable milks, if "burn-on" is to be prevented when the cans are introduced into the sterilizer. Thus, when heating the cans to a temperature of 218° F. in the pressure heater B it is feasible to operate the sterilizer at a temperature of say 243° F. without fear of "burn-on" even with the most sensitive of milks, and the automatic control mechanism governing the steam supply to the sterilizer may be set to maintain this temperature therein. On the other hand if a highly stable milk is being processed it may be feasible to operate the sterilizer at temperatures up to say 251° F. without causing "burn-on." With the heating medium in the sterilizer at a temperature of 243° F. and the cans coming into it at a temperature of 218° F., the time required for the cans to be in it to effect commercial sterilization will be about 13.7 minutes. If the sterilizer temperature is raised to 251° F. the time required for sterilization will be about 7 minutes.

It will be understood, of course, that the temperatures referred to in the foregoing procedure are illustrative only and that other temperatures, either higher or lower, may be selected if desired, and other combinations of pressure heater and sterilizer temperatures may be selected, keeping in mind only that the proportions of air and steam in the pressure heater, and the differential between the temperature of the milk coming from the pressure heater and the temperature maintained in the sterilizer, should be in conformity with the chart of Fig. 1, or the Equations B and C. It will also be understood that the time required for the processing will vary according to the particular temperatures selected.

It should be noted that if temperatures higher than 225° F. are employed in the pressure heater B without increasing the IT of the milk above 50° F., it may become necessary to use stronger cans than have been generally used heretofore for canning milk. Illustrative procedures in which the milk is heated to a temperature above 50° F. before introducing it into the pressure heater are given under Example IV hereinafter and reference may be made thereto for further particulars of this expedient.

It will be apparent, however, that if the IT of the milk is retained at 50° F. then as the temperature in the pressure heater is increased the total pressure of the steam-air medium required to prevent "burn-on" is also increased. Thus if a temperature of 227° F. is employed in the pressure heater and the IT of the milk is 50° F., the RT—IT will be 177° F. and it will be found from the chart of Fig. 1 or the Equation C that a steam-air mixture of 54.8% steam and 45.2% air is required to prevent "burn-on" for all milks having a non-fat solids content of 18.55%. Such a mixture will have a total gauge pressure of 21.1 lbs. per sq. in.

I have found that a common 14½ oz. floated vent filler evaporated milk can of present day conventional design, when sealed at atmospheric pressure and containing the usual 13 ozs. of evaporated milk at the normal filling temperature of about 50° F. is likely to permanently distort when suddenly subjected to an external pressure of about 21 lbs. per sq. in. or more. Such distortion is commonly referred to in the art as "panelling" and is objectionable to the trade. For this reason, the use of the common evaporated milk can referred to may prove unsatisfactory if the temperature employed in the pressure heater B is such that the RT—IT is greater than 175° F. and the heating medium employed is composed of a steam-air mixture in accordance with the maximum curve 3 of Fig. 1 or Equation C.

It is well known, however, that cans of greater strength than the present day common evaporated milk can are readily available since they are in wide-spread use for products other than milk, and even to a considerable extent for milk. Therefore, by making use of such cans, RT—IT values in excess of 175° F. may be used without danger of panelling, and the time saving advantages of the higher temperature differentials also obtained.

Thus I have employed a steam-air heating medium in the pressure heater B composed of 54.4% steam and 45.6% air at a temperature of 235° F. and having a total gauge pressure of 27.1 lbs. per sq. in. and have found that no "burn-on" occurred when the cans of milk at a temperature of 50° F. were introduced into it and subjected thereto for the time necessary to bring the milk temperature up to 228° F. This time is about 9.6 minutes but, due to the higher temperature employed, the temperature in the sterilizer C may also be increased correspondingly, thereby reducing the sterilizing time. For example, a temperature of 253° F. may be used in the sterilizer C without fear of "burn-on" even with the most sensitive of milks and the time required for sterilization will be only about 5.7 minutes. With the highly stable milks the sterilizer may be operated at even higher temperatures as, for example, 261° F. in which case the time required for sterilization will be cut to about 3.6 minutes.

From the sterilizer C the cans are transferred through the transfer valve assembly 172 into the pressure cooler D in which they are subjected to a cooling medium throughout their passage therethrough until they are cooled down to, or substantially to, room temperature by the time they are discharged through the discharge valve assembly 173. This cooling operation is of conventional character and the time required for it in the foregoing procedures of this example, as well as in those of the following Examples II to IV inclusive, may be in conformity with conventional practice, depending, as usual upon the temperature to which the milk is heated in the sterilizing operation, the temperature of the cooling medium employed, the rate at which the cooling medium is changed, and the temperature to which the cans are to be cooled.

*Example II*

Fig. 13 diagrammatically illustrates a modified form of equipment which I contemplate may be used in carrying out the method of my invention in those cases where it is desired to effect the entire heat treatment with the air-steam heating medium. In such cases the equipment may be somewhat simplified and therefore less expensive while at the same time taking up less floor space.

This modified form of equipment is identical to a large extent with that illustrated and described in connection with Example I and the same reference characters have therefore been used to designate like parts insofar as they are specifically depicted. The only differences between the equipment indicated in Fig. 13 and that of Example I are that in Fig. 13 the sterilizer C has been omitted; the discharge valve assembly 50 has been removed from the pressure heater B and the position of the cooler D shifted so that the inlet side of the transfer valve assembly 172 is secured to the pressure heater in place of the discharge valve assembly whereby the transfer valve assembly now receives the cans directly from the pressure heater; and the motor and clutch drive mechanism has been omitted from the cooler and its reel is driven from the transfer valve assembly shaft 181 by extending the inner end of the shaft and providing it with a pinion 189 intermeshing with the adjacent bull gear 84 of the pressure heater.

It is believed that the operation of the equipment indicated in Fig. 13 will be self-evident in view of its similarity with that of Example I, the only material difference being that the steam sterilizing operation of the sterilizer C has been omitted and the entire heat treatment necessary to effect sterilization is effected by the steam-air treatment in the pressure heater B. Ordinarily, however, the temperature employed in the pressure heater of Fig. 13 will be higher than that employed in the pressure heater of Example I since commercial sterilization at temperatures very much lower than 240° F. is generally undesirable due to the excessive length of time required, this being true in the case of the prior conventional practice as well as with my method.

As illustrative of the operation of my method with the equipment of Fig. 13 suppose it is desired to sterilize cans of evaporated milk having a non-fat solids content of 18.55% at a temperature of 250° F. and the initial temperature of the milk as it comes to the pressure heater B from the filling and closing machine A is 50° F. The RT—IT is then 200° F. and it will be found either from the chart of Fig. 1 or by use of the equation C that for this value of RT—IT 46.2% air is necessary in the steam-air heating medium to prevent "burn-on" of all milks having a non-fat solids content of 18.55% so that a steam-air heating medium made up of 53.8% steam and 46.2% air may be used with assurance that no "burn-on" will take place. Such a heating medium will have a total gauge pressure of 40.7 lbs. per sq. in.

In order to obtain such a heating medium in the pressure heater B it is operated in the same manner as described in connection with Example I except that the controller 107 will be set at 250° F., the controller 146 at 40.7 lbs. per sq. in., and the controller for the regulating valve 155 at 43 or 44 lbs. per sq. in. Thus a steam-air heating medium having a temperature of 250° F. and composed of 53.8% steam and 46.2% air will automatically be formed and maintained in the pressure heater and the cans will be subjected to this throughout their travel through the heater. The time required for the cans to be in the pressure heater to effect commercial sterilization of the milk under these conditions will be found to be about 14.65 minutes and the pressure heater reel will, of course, be operated at such speed that each can will be in the heater for this period of time.

If it is desired to shorten the time required for sterilization, the temperature of the heating medium in the pressure heater may be increased as desired. However, for any such increase in temperature, the minimum percentage of air necessary to prevent "burn-on" will be increased and the proper amount may be determined either by reference to the chart of Fig. 1 or by the use of Equation C in the same manner as stated above. For instance, if a heating medium temperature of 260° F. is selected and an initial milk temperature of 50° F. is used, the RT—IT is 210° F. and 46.6% of air in admixture with 53.4% steam is necessary to prevent "burn-on" for all milks having a non-fat solids content of 18.55%. Such a heating medium will show a total gauge pressure of 51.7 lbs. per sq. in. and the time required for sterilization of the milk will be about 10.84 minutes.

*Example III*

Referring now to Fig. 14 of the accompanying drawings I have diagrammatically illustrated an arrangement of equipment for carrying out a further contemplated variation of my process in which the milk is preheated before being introduced into the steam-air heating medium. In this figure the equipment is of the same mechanical construction and operation as that shown in Fig. 13, except that a preheater E has been introduced into the line between the pressure heater elevator 6 and the gravity chute 5 leading from the filling and closing machine A so that the cans are preheated prior to their introduction into the pressure heater B.

The preheater E may be of the conventional open type embodying a hollow shell or casing divided up interiorly into a series of heating zones containing hot water at graduated temperatures, a "reel and spiral" conveying mechanism being employed to advance the cans through the successive zones until they are finally discharged through a can extracting mechanism 190 into a gravity chute 191 which conducts them to the elevator 6 of the pressure heater B. Illustrative examples of preheaters of this character are disclosed in U. S. Letters Patent to A. R. Thompson Nos. 2,092,433 and 2,092,434, both dated September 7, 1937, and the preheater E may be of the construction shown in either of these patents. The cans are delivered from the gravity chute 5 to the inlet mechanism 192 of the preheater by means of a conventional elevator 193. The can inlet mechanism 192 and can extractor mechanism 190, which are not shown in detail in the Thompson patents referred to, are of conventional construction by typical examples are illustrated in U. S. Letters Patent to A. R. Thompson Nos. 1,238,217 and 1,397,990 dated August 28, 1917, and November 22, 1921, respectively.

By using the method of my invention in connection with the processing line shown in Fig. 14, it is unnecessary to preheat the milk to as high a temperature as has heretofore been the practice and, therefore, the temperature of the water in the preheater may range from about 90° F. at the inlet end of the preheater to about 180° F. at the discharge end, and the preheater reel may be so driven that the milk is gradually heated in approximately five minutes from its filling temperature of 50° F. to a temperature of about 160° F. at the time the cans are discharged therefrom.

It is, therefore, apparent from the above that when the cans discharged from the preheater E are introduced into the pressure heater B of Fig. 14 at an initial temperature of 160° F., and a temperature of 250° F. is selected for the steam-air heating medium in the pressure heater, the temperature differential (RT—IT is only 90° F. and, therefore, a heating medium mixture of 62.2% steam and 37.8% air at 250° F. is sufficient to prevent "burn-on" of all milks having a non-fat solids content of 18.55% as determined from the chart of Fig. 1 or the Equation C. This heating medium mixture will have a total gauge pressure of 33.3 lbs. per sq. in. and the time necessary for commercial sterilization of the milk will be about 12 minutes.

It will be apparent, of course, that temperatures either higher or lower than 250° F. may be used in the pressure heater B of Fig. 14 although the higher temperatures will be preferably from a time saving standpoint. Thus if a temperature of 260° F. is selected for the steam-air heating medium in the pressure heater B of Fig. 14, the temperature differential (RT—IT) between the preheated cans of milk coming from the preheater E at a temperature of 160° F. and the retort temperature in the pressure heater B is 100° F. so that according to the chart of Fig. 1 or the Equation C, a mixture of 60.9% steam and 39.1% air is required to prevent "burn-on" of all milks having a non-fat solids content of 18.55%. Under these conditions the time for sterilization of the milk in the sterilizer will be only about 8.2 minutes.

It will also be understood that the milk may be preheated to temperatures either higher or lower than 160° F. in the preheater E if desired before it is introduced into the pressure heater and in each such case, the minimum amount of air required in the steam-air heating medium of the pressure heater to prevent "burn-on" for the respective RT-IT employed may be determined by the use of Formula C or by reference to the chart of Fig. 1.

*Example IV*

It is contemplated that the preheat treatment of Example III may also be combined with the procedure of Example I if desired, and Fig. 15 of the drawings diagrammatically illustrates an arrangement of equipment suitable for this purpose. In Fig. 15 the equipment is the same as that of Fig. 2, except that the preheater E is introduced into the line between the pressure heater elevator 6 and the gravity chute 5 leading from the filling and closing machine A. This preheater, and its associated mechanism is of the same construction and operation as the preheater E of Fig. 14 described in Example III, and likewise serves to raise the temperature of the milk as the cans are passed therethrough from a filling temperature of 50° F. to a temperature of about 160° F. in about five minutes.

The same temperature may be utilized in the pressure heater B and pressure sterilizer C of Fig. 15 as in the case of Example I, but in such case the percentage of steam and air in the steam-air heating medium in the pressure heater will be different since the temperature differential (RT—IT) between the milk entering the heater and the heating medium therewithin will be lower than in Example I. Thus if a temperature of 225° F. is selected for the steam-air heating medium in the pressure heater B of Fig. 15, and the cans coming from the preheater E are introduced into the pressure heater at 160° F., the RT—IT is 65° F. and it will be found from the chart of Fig. 1 or Equation C that a mixture of 32% air and 68% steam is necessary to prevent "burn-on" of all milks having a non-fat solids content of 18.55%. Such a mixture will have a total gauge pressure of 13.1 lbs. per sq. in. and the time required for the milk to be in it to bring the milk from its preheated temperature of 160° F. up to about 7° F. below the temperature of the mixture will be about 5.8 minutes.

On the other hand, if a temperature of 235° F. is selected for the heating medium in the pressure heater B of Fig. 15, then with milk having an IT of 160° F. the RT—IT is 75° F. and according to the chart of Fig. 1 or the Equation C, a mixture of 34.7% air and 65.3% steam is necessary to prevent "burn-on" of all milks having a non-fat solids content of 18.55%. Such a heating medium will have a total gauge pressure of 20.1 lbs. per sq. in. and the time necessary for the cans of milk to be in it until the temperature of the milk reaches 7° F. therebelow will be about 6.3 minutes. The time required for the completion of the sterilization in the sterilizer C of Fig. 15 will be the same in both of the foregoing procedures as in the corresponding procedures of Example I.

It will be observed that, for purposes of convenience, all of the foregoing Examples I to IV inclusive, refer to the treatment of evaporated milk having a non-fat solids content of 18.55%. As above pointed out, however, any other evaporated milk from about 12% to about 25% non-fat solids content may be treated in accordance with the method of my invention. In such case, all that is necessary is to use the Formula C' from which the proper percentage of air may be obtained which is necessary to prevent "burn-on" at any specified RT—IT of any milk of a given non-fat solids content within the range of about 12% to about 25%. Variations in non-fat solids content may thus be taken into account and the percentage of air adjusted in accordance with such variations as indicated by the Formula C'.

It will be understood that permissible differentials between the temperature of the milk coming from the pressure heater and the temperature employed in the sterilizer in Examples I and IV will also vary in accordance with variations in the non-fat solids content of the milk above or below 18.55%. Such differentials for the most sensitive of milks having a non-fat solids content within the range of about 12% to about 25% may readily be determined from the Formula C', and for the most stable of such milks from the Formula B'.

It is also to be observed that in each of the foregoing Examples I to IV inclusive, the amount of air specified to be incorporated in the heating medium is the minimum required to prevent "burn-on" for all milks of the particular non-fat solids content being processed including even the most sensitive. Most milks, however, are sufficiently stable so as not to require so much air in the heating medium to prevent "burn-on" and, if the operator desires to use only the minimum amount for his particular milk, he has only to run a few sample tests to determine how much less air, if any, he can use than that determined from the chart of Fig. 1 or by the Formulae C or C'.

From the illustrative procedures of the forgoing Examples I to IV inclusive, it is apparent that, as compared with the prior conventional continuous process, the method of my invention makes it possible to use either higher temperatures or higher temperature differentials or both, without causing "burn-on." Moreover, the conventional preheating step may be shortened, or eliminated altogether, or my invention may be utilized in conjunction therewith, depending upon the preference of the user. By using the method of my invention it is, therefore, possible to materially shorten the time required to effect commercial sterilization of the milk, as may be seen by comparing the times given by the various procedures of Examples I to IV inclusive, with the time heretofore required for the conventional continuous process. As a result, my process not only has increased capacity, but the final product has a more natural color and flavor as well.

In this connection it may be stated that the heating periods given in all of the above examples are those necessary to effect commercial sterilization of the evaporated milk, and by this is meant such sterilization as will destroy bacteria in quantities normally encountered capable of producing spoilage of the milk. If it is desired to develop greater body or viscosity of the milk, the periods of heat treatment in the sterilizing step of each of the examples may be slightly increased, as, for instance, from ½ to 1 minute. Increased viscosity may also be obtained in known manner by reducing the temperature of the forewarming treatment which is conventionally applied to the milk in connection with the evaporating process.

It may also be pointed out that the heating periods given in the above examples are based on the use of cans of dimensions of the present day standard 14½ oz. tall milk can, namely 3$\frac{13}{16}$ inches tall and 2$\frac{7}{16}$ inches in diameter (outside dimensions) and filled with 13 ozs. of milk at 50° F., and the times given for the heating periods may vary somewhat if different can sizes are used, as will be understood by those skilled in the art.

Variations in the required times of treatment may also result from the use of apparatus differing in construction from that specified in the illustrative examples given herein. For example, the amount and character of agitation imparted to the cans during the heat treatment affects the time required to bring the milk up from one temperature to another and some forms of apparatus impart more agitation than others.

Thus, instead of using the conventional type of "reel and spiral" in the preheaters, pressure heaters and sterilizers of the above examples, the shaker type of reel and spiral such as shown in the aforesaid Thompson Patent No. 2,337,784, may be used in any or all of them as well as in the coolers. Moreover, the shaking section of this type reel and spiral may either extend throughout the entire length of the treating chamber in which it is employed, or, as shown in the aforesaid Thompson patent, it may extend over only a part of the length of the chamber depending upon the preference of the user. The speed of reciprocation of the shaking mechanism may also be varied in accordance with individual preference.

Obviously, apparatus of various other and different constructions may also be employed in the practice of my method and it will be understood that the utility of said method is not confined to the particular forms of apparatus referred to herein, nor is the scope of my method to be limited in any way thereto.

It is also to be understood, of course, that the specific procedures of Examples I to IV, inclusive, are illustrative only, and the method of my invention is not confined thereto since the principle thereof is capable of being exemplified in numerous variations and modifications as will be apparent to those skilled in the art, and I consider myself entitled to all such variations and modifications as fall within the purview of the appended method claims.

It will also be apparent that numerous variations and modifications may be made in the apparatus illustrated herein within the scope of the invention embodied in the construction of such apparatus. Some of these have been mentioned above. Others may comprise modifications or variations in the means employed for agitating the steam-air heating medium in the pressure heater B.

For example, instead of the conduits 115 and steam injectors 118, an arrangement may be used such as indicated in Figs. 16 and 17 wherein vanes 200 are secured to the undersides of certain of the pusher bars 55 of the reel 52 so as to stir up and agitate the heating medium as the reel rotates. These vanes may be arranged in staggered relation as shown and it is obvious that they could be attached to the reel shaft 54, instead of to the pusher bars 55, if desired.

Another arrangement which might be substituted for the conduits 115 and steam injectors 118 is indicated in Figs. 18 and 19 wherein fans 201 are driven by gearing 202 from the reel shaft 54. These fans are also arranged in staggered relation and obviously will operate to stir up and agitate the heating medium in the pressure heater during operation of the reel 52.

The modifications illustrated in Figs. 16 through 19 have the disadvantage that their operation is dependent upon operation of the reel so that when the latter is stopped, the agitation ceases also. Consequently in the event of an interruption in the operation of the reel it may be advisable to delay the feed of cans to the pressure heater for a short time after starting up again until the heating medium has again become thoroughly mixed. However, where fans are employed, they can be driven independently of the reel if desired. Such an arrangement is shown in Fig. 20 wherein fans 203 are mounted in box-like housings 204 secured to the shell of the pressure heater and in open communication with the interior thereof. These fans are mounted on drive shafts 205 projecting out of the housings through suitable stuffing boxes 206 and driven by electric motors 207. Any desired number of fans may be provided and they may be disposed in staggered or other suitable relation so as to effect the desired agitation of the heating medium.

Fans may also be substituted for the steam injectors 118 if desired, as illustrated in Fig. 21. In this modification the lower end of one of the conduits 115 is shown as communicating with the interior of the heater through an elbow 208, pipe section 209, and the opening 121. A fan 210 is mounted on a drive shaft 211 projecting out of the elbow 208 through a suitable stuffing box 212 and driven by an electric motor 213. It will be apparent that the operation of the fan 210 will serve to circulate heating medium into and out of the pressure heater through the conduit 115 in a manner similar to that of the steam injectors 118, and also that in this modification, as well as in those of Figs. 18, 19 and 20, centrifugal type fans may be substituted for the propeller type fans illustrated if desired.

It will be understood that since the steam injectors 118 are eliminated when the modification of Fig. 21 is employed, the piping 123, 125 and 126 is no longer necessary and may be dispensed with. When the modifications of Figs. 16 through 20 are employed this piping and the steam injectors as well as the conduits 115 may be omitted and in such cases the air supply pipes 140 may be tapped directly into the heater shell 36 and the air may be pre-warmed so as to prevent the formation of local cold spots at the points of introduction.

Obviously, not only the structural variations and modifications specifically referred to hereinabove, but also many others may be restorted to within the scope of my invention as embodied in the construction of the apparatus disclosed herein. It will also be understood that while I have described the apparatus of my invention as it may be used in carrying out my improved process of treating evaporated milk in metallic containers, its utility is not necessarily confined thereto and it may be used either in whole or in part for carrying out other processes, or for treating other products, or for treating products in other than metallic containers, such as glass jars, for example. I, therefore, deem myself entitled to all such variations, modifications, and uses as fall within the purview of the appended apparatus claims.

Having thus described the method and apparatus of my invention and in what manner the same may be used, what I claim as new and desire to protect by Letters Patent is:

1. The method of heat treating canned evaporated milk which comprises heating the cans of milk by introducing them into a gaseous heating medium containing steam at a temperature enough higher than that of the milk to cause "burn-on" if the heating medium were composed of steam alone, and preventing such "burn-on" by admixing non-condensable gas with said steam prior to the introduction of the cans into said heating medium.

2. The method of heat treating sealed cans of evaporated milk having a non-fat solids content of from 18% to 25% by weight which comprises heating the cans of milk by introducing them into a heating medium under pressure above atmospheric and at a temperature of 35.6° F. or more higher than that of the milk when the latter is introduced into said medium, said heating medium being composed of steam having non-condensable gas admixed therewith prior to the introduction of the cans into the same to prevent "burn-on" of the milk.

3. In the heat treatment of canned evaporated milk the steps of introducing the cans of milk into a treating zone containing a heating medium comprising steam at a temperature enough higher than that of the milk to cause "burn-on" if the heating medium were composed of steam alone, preventing such "burn-on" by mixing non-condensable gas with said steam prior to the introduction of the cans into said heating medium, heating the cans in said medium, and withdrawing condensate from said zone at a sufficient rate to prevent the establishment of a water level deeper than that which would submerge any of the cans therein.

4. The method of heat treating evaporated milk in sealed cans comprising passing the cans through a treating chamber containing a gaseous heating medium maintained at a temperature above 212° F., said heating medium comprising a mixture of steam and non-condensable gas, heating the cans in said medium, and withdrawing steam-gas mixture from said chamber and circulating it back into the same to stir up the mixture therein and promote uniformity thereof.

5. The method of heat treating evaporated milk in sealed cans comprising passing the cans through a treating chamber containing a gaseous heating medium maintained at a temperature above 212° F., said heating medium comprising a mixture of steam and non-condensable gas, heating the cans in said heating medium, withdrawing steam-gas mixture from said chamber and circulating it back into the same to stir up the mixture therein and promote uniformity thereof, and withdrawing condensate from said chamber at a sufficient rate to prevent the establishment of a water level deeper than that which would submerge any of the cans therein.

6. The method of heat treating evaporated milk in sealed cans comprising heating the cans by passing them through a treating chamber containing a gaseous heating medium having a temperature above 212° F., said heating medium comprising a mixture of steam and non-condensable gas, maintaining the temperature of said heating medium by feeding additional steam thereto to compensate for heat losses, and utilizing the feed of said additional steam to withdraw a portion of the steam-gas mixture from said chamber and circulate it back into the same to stir up the mixture therein and promote uniformity thereof.

7. The method of heat treating sealed cans of evaporated milk comprising heating the cans by passing them through a treating chamber containing a heating medium composed of a mixture of steam and non-condensable gas, withdrawing a portion of said mixture from the chamber, admitting additional non-condensable gas to the withdrawn mixture and circulating the withdrawn mixture containing said additional non-condensable gas back into said chamber to thereby mix and distribute the additional non-condensable gas into the mixture contained in said chamber.

8. The method of heat treating evaporated milk in sealed cans comprising heating the cans by passing them through a treating chamber containing a heating medium composed of a mixture of steam and non-condensable gas, maintaining said heating medium at a predetermined temperature by introducing additional steam thereto to compensate for heat losses, and utilizing said additional steam for introducing and distributing additional non-condensable gas into said heating medium to compensate for losses of non-condensable gas from said chamber.

9. The method of heat treating evaporated milk in sealed cans comprising heating the cans by passing them through a treating chamber containing a heating medium composed of a mixture of steam and non-condensable gas, and maintaining said heating medium at a predetermined temperature by admitting additional steam thereto to compensate for heat losses, at least a portion of said additional steam being admitted in the form of jets directed into said chamber to stir up the mixture therein and promote uniformity thereof.

10. In a method of heat treating evaporated milk in sealed cans by passing the cans through the treating chamber of a continuous heater having movable valves through which the cans are introduced into and discharged from said chamber, said treating chamber containing a heating medium composed of a mixture of steam and non-condensable gas heating the cans by passing them through said chamber, the steps of maintaining said heating medium at a predetermined temperature by admitting additional steam thereto to compensate for heat losses, continuously admitting a portion of said additional steam in the form of jets directed into said chamber to stir up the mixture therein and promote uniformity thereof, regulating the admission of the remainder of said additional steam in accordance with the temperature within said chamber, and limiting the rate at which steam is supplied by said jets to not more than that required to compensate for heat losses from said heater when said valves are idle and no cans are passing through the chamber.

11. The method of heat treating sealed cans of evaporated milk comprising heating the cans by introducing them into a treating chamber containing a heating medium composed of a mixture of steam and non-condensable gas, admitting additional non-condensable gas into said chamber to compensate for losses of such gas therefrom, and heating said non-condensable gas prior to admitting it into said chamber.

12. The method of heat treating sealed cans of evaporated milk comprising heating the cans by passing them through a treating chamber containing a heating medium composed of a mixture of steam and non-condensable gas, admitting additional non-condensable gas into said chamber to compensate for losses of such gas therefrom, and mixing steam with said additional non-condensable gas prior to admitting the latter into said chamber.

13. In the heat treatment of canned evaporated milk in which the cans of milk at a temperature of about 50° F. are introduced into a heating medium comprising steam at a temperature above 212° F., preventing "burn-on" of the milk by admixing non-condensable gas with said steam prior to the introduction of the cans into said heating medium.

14. In the heat treatment of canned evaporated milk in which the cans of milk following the filling and closing operation are introduced without preliminary heat treatment into a heating medium containing steam at a temperature enough higher than that of the milk to cause "burn-on" if the heating medium were composed of steam alone, preventing such "burn-on" by admixing non-condensable gas with said steam prior to the introduction of the cans into said heating medium.

15. In the heat treatment of canned evaporated milk in which the cans of milk following the filling and closing operation are introduced without preliminary heat treatment into a heat medium comprising steam at a temperature above 212° F., preventing "burn-on" of the milk by admixing non-condensable gas with said steam prior to the introduction of the cans into said heating medium.

16. A method of heat treating evaporated milk in sealed cans which comprises heating the cans by introducing the cans of milk into a heating medium comprising steam having non-condensable gas admixed therewith to prevent "burn-on" of the milk, subjecting the cans to said heating medium for a period of time sufficient to elevate the temperature of the milk, but short of the time necessary to effect sterilization, and completing the sterilization by transferring and subjecting the cans to a heating medium containing no such added non-condensable gas and having a temperature sufficient to effect sterilization of the milk.

17. A method of heat treating evaporated milk in sealed cans following the filling and closing operation which comprises the steps of heating the cans of milk by introducing them while at substantially filling temperature, into a heating medium comprising steam having non-condensable gas admixed therewith to prevent "burn-on" of the milk, subjecting the cans to said heating medium for a period of time sufficient to elevate the temperature of the milk, but short of the time necessary to effect sterilization, and completing the sterilization by transferring and subjecting the cans to a heating medium containing no such added non-condensable gas and having a temperature sufficient to effect sterilization of the milk, but insufficient to cause "burn-on" of the milk when the cans are transferred into it from the first mentioned heating medium.

18. A method of heat treating evaporated milk in sealed cans following the filling and closing operation, which comprises the steps of heating the cans of milk by introducing them while the milk is at substantially filling temperature into a heating medium of sterilizing temperature and comprising steam having non-condensable gas admixed therewith prior to the introduction of the cans into the same to prevent "burn-on" of the milk, and maintaining the cans in said heating medium until the milk is sterilized.

19. A method of heat treating evaporated milk which has been filled and sealed into cans at a temperature of approximately 50° F., comprising the steps of heating the cans by introducing the cans of milk substantially at filling temperature into a heating medium of sterilizing temperature and under pressure above atmospheric, said heating medium comprising steam having non-condensable gas admixed therewith prior to the admittance of the cans thereinto to prevent "burn-on" of the milk, and maintaining the cans in said heating medium until the milk is sterilized.

20. A method of heat treating sealed cans of evaporated milk having a non-fat solids content of from about 18% to about 25% by weight which comprises heating the cans of milk by introducing them into a heating medium comprising a mixture of steam and non-condensable gas, said heating medium being more than 35.6° F. higher than that of the milk when the latter is introduced into it, the percent partial absolute pressure of non-condensable gas in said heating medium being at least as large as the value obtainable from the formula:

$$Y_3 - 20 = \log_{10}^{-1}(.8214 + .0266X) + \log_{10}^{-1}(3.1484 + 1.06X)$$

in which formula $Y_3$ represents the difference in degrees Fahrenheit between the temperature of the heating medium and the temperature of the milk when the latter is introduced into said heating medium, and X represents the percent partial absolute pressure of non-condensable gas in said heating medium.

21. A method of heat treating sealed cans of evaporated milk having a non-fat solids content of from 18% to 25% by weight which comprises heating the cans of milk by introducing them into a heating medium comprising a mixture of steam and non-condensable gas, said heating medium being more than 35.6° F. higher than that of the milk when the latter is introduced into it, the percent partial absolute pressure of non-condensable gas in said heating medium being at least as large as the volume obtainable from the formula:

$$\log_{10}(Y_2 - 20) = 1.193 + .0334X$$

in which formula $Y_2$ represents the difference in degrees Fahrenheit between the temperature of the heating medium and the temperature of the milk when the latter is introduced into said heating medium, and X represents the percent partial absolute pressure of non-condensable gas in said heating medium.

22. A method of heat treating sealed cans of evaporated milk having a non-fat solids content between 12% and 25% by weight which comprises heating the cans of milk by introducing them into a heating medium comprising a mixture of steam and non-condensable gas, said heating medium being higher than that of the milk when the latter is introduced into it, the percent partial absolute pressure of non-condensable gas in said heating medium being substantially equal to the value obtainable from said formula, to wit:

$$Y_3 - 20 = \log_{10}^{-1}[0.7782 + .0266(X - 2.55S + 47.3)] + \log_{10}^{-1}[3.0000 + 0.106(X - 2.55S + 47.3)]$$

in which formula $Y_3$ represents the difference in degrees Fahrenheit between the temperature of the heating medium and the temperature of the milk when the latter is introduced into said heating medium, X represents the percent partial absolute pressure of non-condensable gas in said heating medium, and S represents the percentage by weight of the non-fat solids content of the milk.

23. A method of heat treating sealed cans of evaporated milk having a non-fat solids content between 12% and 25% by weight which comprises heating the cans of milk by introducing them into a heating medium comprising a mixture of steam and non-condensable gas, said heating medium being at a temperature above 212° F. and at least 35.6° F. higher than the temperature of the milk when the latter is introduced into it, the percent partial absolute pressure of non-condensable gas in said heating medium being at least as large as the value obtainable from said formula, to wit:

$$Y_3 - 20 = \log_{10}^{-1}[0.7782 + .0266(X - 2.55S + 47.3)] + \log_{10}^{-1}[3.0000 + 0.106(X - 2.55S + 47.3)]$$

in which formula $Y_3$ represents the difference in degrees Fahrenheit between the temperature of the heating medium and the temperature of the milk when the latter is introduced into said heating medium, X represents the percent partial absolute pressure of non-condensable gas in said heating medium, and S represents the percentage by weight of the non-fat solids content of the milk.

24. A method of heat treating sealed cans of evaporated milk having non-fat solids content between 12% and 25% by weight which comprises heating the cans of milk by introducing them into a heating medium comprising a mixture of steam and non-condensable gas, said heating medium being at a temperature above 212° F. and at least 35.6° F. higher than the temperature of the milk when the latter is introduced into it, the percent partial absolute pressure of non-condensable gas in said heating medium being at least as large as the value obtainable from said formula, to wit:

$$\log_{10}(Y_2 - 20) = 1.146 + .0334(X - 2.55S + 47.3)$$

in which formula $Y_2$ represents the difference in degrees Fahrenheit between the temperature of the heating medium and the temperature of the milk when the latter is introduced into said heating medium, X represents the percent partial absolute pressure of non-condensable gas in said heating medium, and S represents the percentage by weight of the non-fat solids content of the milk.

25. A method of heat treating sealed cans of evaporated milk having a non-fat solids content between 12% and 25% by weight which comprises heating the cans of milk by introducing them into a heating medium comprising a mixture of steam and non-condensable gas, said heating medium being at a temperature above 212° F. and higher than that of the milk when the latter is introduced into it, the percent partial absolute pressure of non-condensable gas in said heating medium being from about the value obtainable from the formula:

$$\log_{10}(Y_2 - 20) = 1.146 + .0334(X - 255S + 47.3)$$

to about that obtainable from the formula:

$$Y_3 - 20 = \log_{10}^{-1}[0.7782 + .0266(X - 2.55S + 47.3)] + \log_{10}^{-1}[3.0000 + 0.106(X - 2.55S + 47.3)]$$

in which formulae $Y_2$ and $Y_3$ represent the difference in degrees Fahrenheit between the temperature of the heating medium and the temperature of the milk when the latter is introduced into said heating medium X represents the percent partial absolute pressure of non-condensable gas in said heating medium, and S represents the percentage by weight of the non-fat solids content of the milk.

26. An apparatus for heat treating evaporated milk in sealed cans comprising a heat treating chamber, means for establishing and automatically maintaining a heating medium comprising a mixture of steam and non-condensable gas in said chamber, means for introducing the cans into said chamber, means for advancing the cans through said chamber, means for agitating said heating medium to promote uniformity of the mixture, in said chamber, and means for discharging the cans from said chamber.

27. An apparatus for heat treating evaporated milk in sealed cans comprising a heat treating chamber, means for establishing and maintaining a heating medium comprising a mixture of steam and non-condensalbe gas in said chamber, means for introducing the cans into said chamber, means for conveying the cans through said chamber, means operable independently of said conveying means for agitating the heating medium in said chamber, and means for removing the cans from said chamber.

28. An apparatus for heat treating evaporated milk in sealed cans comprising a heat treating chamber, means for establishing and maintaining a heating medium of steam and non-condensable gas under pressure above atmospheric in said chamber, means for advancing the cans through said chamber, means for admitting non-condensable gas into said chamber to compensate for losses thereof, and means for continuously admitting steam under sufficient velocity into said chamber to stir up the heating medium therein and promote uniformity thereof.

29. An apparatus for heat treating evaporated milk in sealed cans, comprising a heater having a heat treating chamber therewithin, means for establishing and maintaining a heating medium of steam and non-condensable gas in said chamber, means for advancing the cans through said chamber, movable valves for introducing the cans into and discharging them from said chamber, means for driving said valves, means for supplying steam to said chamber, means for regulating said steam supply means to admit steam in accordance with the temperature of said heating medium, and auxiliary steam supply means for continuously injecting steam into said chamber in the form of jets to stir up the heating medium therein and promote uniformity thereof, said auxiliary steam supply means being adapted to deliver steam at not more than the rate required to compensate for heat losses from said heater when said valves are idle and no cans are passing through the heater.

30. An apparatus for heat treating evaporated milk in sealed cans comprising a chamber, means for establishing and automatically maintaining a heating medium mixture of steam and non-condensable gas in said chamber. means for introducing the cans into the chamber, means for advancing the cans through said chamber, means for discharging the cans from said chamber, and means associated with said advancing means for agitating the heating medium in said chamber.

31. An apparatus for heat treating evaporated milk in sealed cans comprising a treating chamber, means for establishing and maintaining a heating medium mixture of steam and non-condensable gas in said chamber, means for advancing the cans through said chamber comprising a helical canway and a rotatable reel, and a plurality of vanes mounted on said reel for agitating the heating medium in said chamber during the rotation of the said reel.

32. An apparatus for heat treating evaporated milk in sealed cans comprising a chamber, means for establishing and automatically maintaining a heating medium mixture of steam and non-condensable gas in said chamber, means for introducing the cans into said chamber, means for advancing the cans through said chamber, means for discharging the cans from said chamber, and a fan in said chamber for agitating the heating medium to prevent stratification thereof.

33. An apparatus for heat treating evaporated milk in sealed cans comprising a heat treating chamber, means for establishing and automatically maintaining a heating medium comprising steam and non-condensable gas in said chamber, a can conveying mechanism associated with said chamber for admitting the cans thereto, for conveying them through the chamber and for discharging them therefrom, a conduit communicating at separate points with said chamber, and means co-acting with said conduit for circulating heating medium from said chamber through said conduit and back into said chamber to stir up and promote uniformity of the mixture in said chamber.

34. A pressure heater comprising a treating chamber, means for establishing and automatically maintaining a heating medium comprising steam and non-condensable gas in said chamber, a conduit connecting different sections of said chamber, and a steam jet cooperatively arranged with said conduit for creating a flow of heating medium therethrough whereby said heating medium is withdrawn from one section of said chamber and returned through said conduit to another section of said chamber.

35. A pressure heater comprising a treating chamber, means for establishing and automatically maintaining a heating medium comprising steam and non-condensable gas in said chamber, a conduit exterior of said chamber and connecting different sections thereof, a steam jet adjacent one end of said conduit for admitting steam through said end of the conduit into said chamber whereby heating medium is withdrawn from one section of said chamber into the other end of said conduit and is returned through said conduit to another section of said chamber.

36. An apparatus for heat treating evaporated milk in sealed cans comprising a treating chamber, means for establishing and automatically maintaining a heating medium mixture of steam and non-condensable gas in said chamber, a conduit connecting different sections of said chamber, means cooperatively arranged with said conduit for circulating heating medium from said chamber through said conduit and back into the chamber to stir up and promote uniformity of the mixture in said chamber, and means for admitting additional non-condensable gas to said conduit whereby said additional gas is warmed prior to its introduction into the treating chamber.

37. An apparatus for heat treating evaporated milk in sealed cans comprising a treating chamber, means for establishing and maintaining a heating medium mixture of steam and non-condensable gas in said chamber, a conduit connecting different sections of said chamber, a steam jet cooperatively arranged with said conduit for circulating heating medium from said chamber through said conduit and back into the chamber to stir up and promote uniformity of the mixture in said chamber, and means for admitting additional non-condensable gas to said conduit whereby said additional gas is warmed prior to its introduction into the treating chamber.

38. A pressure heater comprising a treating chamber, means for advancing cans through said chamber, a conduit establishing communication between different sections of said chamber, means for admitting steam under pressure above atmospheric into said chamber, means for admitting compressed air at a pressure in excess of the steam pressure into said conduit adjacent one end thereof, means for admitting a jet of steam into said conduit in a direction toward the other end of said conduit to thereby admit the jet of steam into said chamber and to create a reduced pressure in the remainder of said conduit to effect circulation of said compressed air through said conduit into said chamber and simultaneous mixing thereof with said jet of steam and the steam in said chamber.

39. An apparatus for heat treating evaporated milk in sealed cans comprising a treating chamber, means for establishing and automatically maintaining a heating medium comprising a mixture of steam and non-condensable gas in said chamber, means for introducing the cans of milk to be treated in a continuous flow into said chamber, for advancing them through said chamber and for discharging them in a continuous flow therefrom, means for admitting additional non-condensable gas into said chamber to compensate for losses of such gas therefrom, and means for heating said non-condensable gas prior to admitting it into said chamber.

40. An apparatus for heat treating evaporated milk in sealed cans comprising a treating chamber, means for automatically establishing and maintaining a heating medium comprising a mixture of steam and non-condensable gas in said chamber, means for admitting additional non-condensable gas into said chamber to compensate for losses of such gas therefrom, and means exteriorly of said chamber for mixing steam with said non-condensable gas prior to admitting the latter into the chamber.

41. An apparatus for heat treating evaporated milk in sealed cans comprising a heat treating chamber, means for establishing and maintaining a steam heating medium under pressure above atmospheric in said chamber, a second heat treating chamber, means for maintaining a heating medium in said second heat treating chamber under pressure above atmospheric and at sterilizing temperature, means for introducing a non-condensable gas into the heating medium within said first named heat treating chamber only, means for advancing cans of milk through said first named chamber to subject the milk to heat treatment short of sterilization, and means for receiving the cans from said first mentioned chamber and advancing them through the second chamber to effect sterilization of the milk therein.

42. An apparatus for heat treating evaporated milk in sealed cans comprising a heat treating chamber, means for establishing and maintaining a steam heating medium under pressure above atmospheric in said chamber, a second heat treating chamber, means for maintaining a heating medium in said second heat treating chamber at a sterilizing temperature at least as high as the temperature in said first mentioned chamber, means for introducing a non-condensable gas into the heating medium within said first named heat treating chamber only, means for advancing cans of milk through said first named chamber to subject the milk to heat treatment short of sterilization but sufficient to raise its temperature high enough to prevent "burn-on" when the cans are transferred to the second chamber, and means for receiving the cans from said first mentioned chamber and advancing them through the second chamber to effect sterilization of the milk therein.

PAUL C. WILBUR.

REFERENCES CITED

The following references are of record in the file of this patent:

UNITED STATES PATENTS

| Number | Name | Date |
|---|---|---|
| 342,412 | Wicks | May 25, 1886 |
| 1,851,820 | Dunbar | Mar. 29, 1932 |
| 2,043,310 | Thompson | June 9, 1936 |
| 2,051,391 | Raney | Aug. 18, 1936 |
| 2,284,269 | Eberts | May 26, 1942 |
| 2,322,693 | Kennedy | June 22, 1943 |
| 2,328,751 | Snyder et al. | Sept. 7, 1943 |
| 2,372,239 | Whitaker et al. | Mar. 27, 1945 |
| 2,388,103 | Whitaker et al. | Oct. 30, 1945 |